United States Patent
Kuniba

(10) Patent No.: US 8,103,119 B2
(45) Date of Patent: Jan. 24, 2012

(54) IMAGE PROCESSING DEVICE, IMAGE PROCESSING METHOD, IMAGE PROCESSING PROGRAM PRODUCT, AND IMAGE-CAPTURING DEVICE

(75) Inventor: Hideyasu Kuniba, Rochester, NY (US)

(73) Assignee: Nikon Corporation, Tokyo (JP)

( * ) Notice: Subject to any disclaimer, the term of this patent is extended or adjusted under 35 U.S.C. 154(b) by 1003 days.

(21) Appl. No.: 11/922,313

(22) PCT Filed: Jun. 19, 2006

(86) PCT No.: PCT/JP2006/312245
§ 371 (c)(1),
(2), (4) Date: Dec. 17, 2007

(87) PCT Pub. No.: WO2006/137361
PCT Pub. Date: Dec. 28, 2006

(65) Prior Publication Data
US 2008/0253650 A1 Oct. 16, 2008

(30) Foreign Application Priority Data

Jun. 20, 2005 (JP) ................................ 2005-179067
Sep. 29, 2005 (JP) ................................ 2005-284569

(51) Int. Cl.
*G06K 9/00* (2006.01)
*G06K 9/38* (2006.01)
*G06K 9/40* (2006.01)
(52) U.S. Cl. ......................... 382/274; 382/167; 382/272
(58) Field of Classification Search .................. None
See application file for complete search history.

(56) References Cited

U.S. PATENT DOCUMENTS

| 4,500,919 | A | * | 2/1985 | Schreiber ...................... 358/518 |
| 5,517,333 | A | * | 5/1996 | Tamura et al. ................. 358/518 |
| 5,684,509 | A | * | 11/1997 | Hatanaka et al. ............. 345/615 |
| 5,875,262 | A | * | 2/1999 | Asada ........................... 382/169 |
| 5,991,456 | A | | 11/1999 | Rahman et al. |
| 6,040,860 | A | * | 3/2000 | Tamura et al. ................. 348/252 |
| 6,101,271 | A | | 8/2000 | Yamashita et al. |
| 6,603,878 | B1 | * | 8/2003 | Takemoto ..................... 382/167 |
| 6,683,982 | B1 | * | 1/2004 | Kohn ............................ 382/167 |
| 6,768,514 | B1 | * | 7/2004 | Tsuchiya et al. .............. 348/252 |
| 6,813,041 | B1 | | 11/2004 | Moroney et al. |

(Continued)

FOREIGN PATENT DOCUMENTS

EP 0 255 949 A2 2/1988

(Continued)

OTHER PUBLICATIONS

European Search Report issued in European Patent Application No. 06766909.3, dated Jul. 2, 2010.

(Continued)

*Primary Examiner* — Vikkram Bali
*Assistant Examiner* — Michelle Entezari
(74) *Attorney, Agent, or Firm* — Oliff & Berridge, PLC

(57) ABSTRACT

An image processing device includes: a parameter calculation unit that obtains a plurality of values based on a plurality of different conversion parameters for a pixel in image data; a weighting unit that performs predetermined weighting on the plurality of values obtained by the parameter calculation unit; and a gradation correction unit that performs gradation correction of the image data based on a result of the weighting by the weighting unit.

27 Claims, 17 Drawing Sheets

U.S. PATENT DOCUMENTS

| | | |
|---|---|---|
| 7,088,390 B2 * | 8/2006 | Mori et al. .................... 348/254 |
| 7,092,122 B2 * | 8/2006 | Iwaki ............................ 358/1.9 |
| 7,460,168 B2 * | 12/2008 | Horiuchi ...................... 348/362 |
| 7,663,677 B2 * | 2/2010 | Shiraishi ...................... 348/254 |
| 7,876,367 B2 * | 1/2011 | Muramatsu ................ 348/229.1 |
| 7,912,282 B2 * | 3/2011 | Nakamura ................... 382/167 |
| 7,949,201 B2 * | 5/2011 | Suzuki ......................... 382/274 |
| 2001/0007559 A1 | 7/2001 | Le Pennec et al. |
| 2003/0020974 A1 | 1/2003 | Matsushima |
| 2004/0051794 A1 * | 3/2004 | Horita ........................... 348/234 |
| 2004/0080631 A1 | 4/2004 | Tominaga et al. |
| 2004/0119995 A1 | 6/2004 | Nishi et al. |
| 2004/0189818 A1 * | 9/2004 | Tsuruoka et al. .......... 348/221.1 |
| 2005/0013506 A1 * | 1/2005 | Yano ............................. 382/274 |
| 2005/0074179 A1 | 4/2005 | Wilensky |
| 2005/0163372 A1 * | 7/2005 | Kida et al. ................... 382/169 |
| 2005/0226526 A1 | 10/2005 | Mitsunaga |
| 2005/0231524 A1 * | 10/2005 | Fukasawa et al. ........... 345/590 |

FOREIGN PATENT DOCUMENTS

| | | |
|---|---|---|
| EP | 0 424 920 A2 | 5/1991 |
| EP | 1 128 660 A2 | 8/2001 |
| JP | A-6-62252 | 3/1994 |
| JP | A-2001-136438 | 5/2001 |
| JP | A-2002-77616 | 3/2002 |
| JP | A-2002-135587 | 5/2002 |
| JP | A-2004-140553 | 5/2004 |
| JP | A-2004-140692 | 5/2004 |
| JP | A-2004-165840 | 6/2004 |
| JP | A-2004-221644 | 8/2004 |
| JP | A-2005-117524 | 4/2005 |

OTHER PUBLICATIONS

Foreign Office Action dated Mar. 18, 2011 issued in European Application No. 06 766 909.3.

May 24, 2011 Office Action issued in Japanese Application No. 2007-522273 (with translation).

* cited by examiner

X : Edge Samples (a)  (b)

(a)        (b)

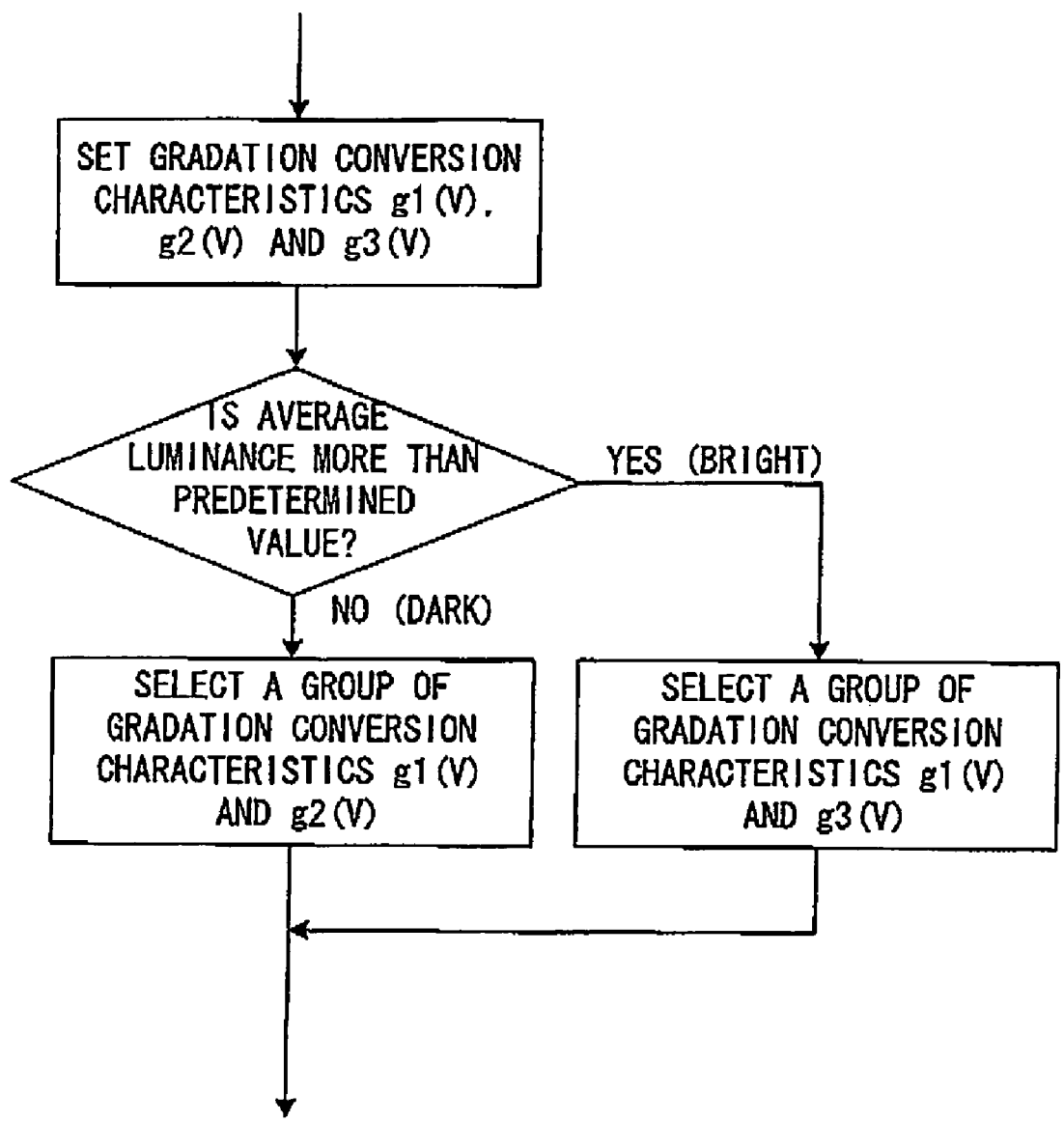

IMAGE PROCESSING DEVICE, IMAGE PROCESSING METHOD, IMAGE PROCESSING PROGRAM PRODUCT, AND IMAGE-CAPTURING DEVICE

TECHNICAL FILED

The present invention relates to an image processing device, an image processing method, and an image processing program product for processing an image, as well as an image-capturing device for capturing an image.

BACKGROUND ART

The image processing program as described below is known from Patent Document 1. According to the image processing program, Retinex processing is performed to realize gradation correction depending on local brightness of an image.

Patent Document 1: Japanese Laid-Open Patent Publication No. 2004-165840.

DISCLOSURE OF THE INVENTION

Problem to be Solved by the Invention

However, in the conventional program, it is necessary to perform Retinex processing in order to perform gradation correction and hence there arises a problem that when Retinex processing is performed, there may occur an adverse influence that the image obtained after the gradation correction will get gradation that is not present in the original image.

Means for Solving the Problem

According to the 1st aspect of the present invention, an image processing device comprises: a parameter calculation unit that obtains a plurality of values based on a plurality of different conversion parameters for a pixel in image data; a weighting unit that performs predetermined weighting on the plurality of values obtained by the parameter calculation unit; and a gradation correction unit that performs gradation correction of the image data based on a result of the weighting by the weighting unit.

According to the 2nd aspect of the present invention, in the image processing device according to the 1st aspect, it is preferred that the parameter calculation unit obtains the plurality of values based on a plurality of gradation conversions having different characteristics for the pixel in the image data.

According to the 3rd aspect of the present invention, in the image processing device according to the 1st or 2nd aspect, it is preferred that the gradation correction unit includes a gain coefficient calculation unit that calculates again coefficient of a pixel based on the result of the weighting by the weighting unit, and performs the gradation correction of the image data according to the gain coefficient calculated by the gain coefficient calculation unit.

According to the 4th aspect of the present invention, in the image processing device according to any one of the 1st to 3rd aspects, it is preferred that the weighting unit performs the predetermined weighting according to brightness of neighborhood pixels neighboring the pixel.

According to the 5th aspect of the present invention, in the image processing device according to the 4th aspect, it is preferred that: the image processing device further comprises an exposure correction value acquiring unit that acquires an exposure correction value set upon capturing an image corresponding to the image data, and a brightness correcting unit that corrects brightness of the neighborhood pixels neighboring the pixel based on a result of the acquiring by the exposure correction value acquiring unit; and the parameter calculation unit obtains the plurality of values based on image data corrected by the brightness correcting unit.

According to the 6th aspect of the present invention, in the image processing device according to any one of the 2nd to 5th aspects, it is preferred that: the image processing device further comprises a selection unit that selects two gradation conversions out of the plurality of gradation conversions that are three or more types of gradation conversions according to brightness of an image; and the parameter calculation unit obtains the plurality of values with a brightness value of a pixel using each of the two gradation conversions selected by the selection unit.

According to the 7th aspect of the present invention, in the image processing device according to the 6th aspect, it is preferred that the plurality of gradation conversions include a first gradation conversion having a characteristic represented by a curve that is monotonically increasing and concave upward in at least a part thereof, a second gradation conversion having a characteristic represented by a curve that is monotonically increasing and concave upward in at least a part thereof and having the characteristic in which a change of an output value for an input is smaller than the first gradation conversion, and a third gradation conversion having a characteristic represented by a curve that is monotonically increasing and concave downward in at least a part thereof.

According to the 8th aspect of the present invention, in the image processing device according to the 7th aspect, it is preferred that when an average luminance within a predetermined range of the image data is less than a predetermined value, the selection unit selects the first gradation conversion and the second gradation conversion.

According to the 9th aspect of the present invention, in the image processing device according to the 7th aspect, it is preferred that when an average luminance within a predetermined range of the image data is equal to or more than a predetermined value, the selection unit selects the first gradation conversion or the second gradation conversion, and the third gradation conversion.

According to the 10th aspect of the present invention, in the image processing device according to any one of the 3rd to 9th aspects, it is preferred that when the image data are expressed in a primary color system expression, the gain coefficient calculation unit calculates a gain coefficient for performing gradation correction, based on one color component included in the image data, of another color component.

According to the 11th aspect of the present invention, in the image processing device according to any one of the 3rd to 9th aspects, it is preferred that when the image data are expressed in a luminance and chrominance expression, the gain coefficient calculation unit calculates a gain coefficient for performing gradation correction of a luminance of each pixel in the image data based on a luminance of the image data.

According to the 12th aspect of the present invention, in the image processing device according to the 11th aspect, it is preferred that: the image processing device further comprises a chrominance data correction unit that corrects chrominance data of each pixel according to the gain coefficient for each pixel obtained by the gain coefficient calculation unit.

According to the 13th aspect of the present invention, in the image processing device according to the 1st aspect, it is preferred that the plurality of values are a plurality of gain coefficients.

According to the 14th aspect of the present invention, in the image processing device according to the 4th aspect, it is preferred that the image processing device further comprises: a reduced image generation unit that generates reduced image data of a reduced image based on the image data; a smoothing unit that performs smoothing processing of the reduced image data; and a neighborhood calculation unit that obtains the brightness of the neighborhood pixels based on the reduced image data having undergone the smoothing processing.

According to the 15th aspect of the present invention, in the image processing method comprising: a parameter calculating step that obtains a plurality of values based on a plurality of different conversion parameters for a pixel in image data; a weighting step that performs predetermined weighting on the plurality of values obtained in the parameter calculating step; and a gradation correction step that performs gradation correction of the image data based on a result of the weighting in the weighting step.

According to the 16th aspect of the present invention, in the image processing method according to the 15th aspect, it is preferred that the parameter calculation step obtains the plurality of values based on a plurality of gradation conversions having different characteristics for the pixel in the image data.

According to the 17th aspect of the present invention, in the image processing method according to the 15th or 16th aspect, it is preferred that the gradation correction step includes a gain coefficient calculation step that calculates a gain coefficient of a pixel based on the result of the weighting by the weighting step, and performs the gradation correction of the image data according to the gain coefficient calculated by the gain coefficient calculation step.

According to the 18th aspect of the present invention, in the image processing method according to any one of the 15th to 17th aspects, it is preferred that the weighting step performs the predetermined weighting according to brightness of neighborhood pixels neighboring the pixel.

According to the 19th aspect of the present invention, in the image processing method according to the 18th aspect, it is preferred that: the image processing device further comprises an exposure correction value acquiring step that acquires an exposure correction value set upon capturing an image corresponding to the image data, and a brightness correction step that corrects brightness of the neighborhood pixels neighboring the pixel based on a result of the exposure correction value acquiring step; and the parameter calculation step obtains the plurality of values based on image data corrected by the brightness correction step.

According to the 20th aspect of the present invention, in the image processing method according to any one of the 16th to 19th aspects, it is preferred that: the image processing method further comprises a selection step that selects two gradation conversions from three or more types of gradation conversions according to brightness of an image; and the parameter calculation step obtains the plurality of values from with a brightness value of the pixel using each of the two gradation conversions selected in the selection step.

According to the 21st aspect of the present invention, in the image processing method according to the 20th aspect, it is preferred that the plurality of gradation conversions include a first gradation conversion having a characteristic represented by a curve that is monotonically increasing and concave upward in at least a part thereof, a second gradation conversion having a characteristic represented by a curve that is monotonically increasing and concave upward in at least a part thereof and having the characteristic in which a change of an output value for an input is smaller than the first gradation conversion, and a third gradation conversion having a characteristic represented by a curve that is monotonically increasing and concave downward in at least a part thereof.

According to the 22nd aspect of the present invention, in the image processing method according to the 21st aspect, it is preferred that when an average luminance within a predetermined range of the image data is less than a predetermined value, the selection step selects the first gradation conversion and the second gradation conversion.

According to the 23rd aspect of the present invention, in the image processing method according to the 21st aspect, it is preferred that when an average luminance within a predetermined range of the image data is equal to or more than a predetermined value, the selection step selects the first gradation conversion or the second gradation conversion, and the third gradation conversion.

According to the 24th aspect of the present invention, in the image processing method according to any one of the 17th to 23rd aspects, it is preferred that when the image data are expressed in a primary color system expression, the gain coefficient calculation step calculates a gain coefficient for performing gradation correction, based on one color component included in the image data, of another color component.

According to the 25th aspect of the present invention, in the image processing method according to any one of the 17th to 2.3rd aspects, it is preferred that when the image data are expressed in a luminance and chrominance expression, the gain coefficient calculation step calculates a gain coefficient for performing gradation correction of a luminance of each pixel in the image data based on a luminance of the image data.

According to the 26th aspect of the present invention, in the image processing method according to the 25th aspect, it is preferred that the image processing method further comprises a chrominance data correction step that corrects chrominance data of each pixel according to the gain coefficient for each pixel obtained by the gain coefficient calculation step.

According to the 27th aspect of the present invention, in the image processing method according to the 13th aspect, it is preferred that the plurality of values are a plurality of gain coefficients.

According to the 28th aspect of the present invention, in the image processing method according to the 18th aspect, it is preferred that the image processing method further comprises: a reduced image generation step that generates reduced image data of a reduced image based on the image data; a smoothing step that performs smoothing processing of the reduced image data, and a neighborhood calculation step that obtains the brightness of the neighborhood pixels based on the reduced image data having undergone the smoothing processing.

According to the 29th aspect of the present invention, an image processing method comprises: acquiring an image including a plurality of pixels; obtaining a plurality of values corresponding to a plurality of different characteristics based on a value indicating a luminance of a target pixel; obtaining brightness of a vicinity of the target pixel; obtaining a weighted average of the obtained plurality of values based on the brightness of the vicinity of the target pixel; and performing gradation correction of the target pixel based on the value indicating the luminance of the target pixel and the obtained weighted average.

According to the 30th aspect of the present invention, a computer-readable computer program product comprises an image processing program for causing a computer to execute an image processing method according to any one of the 15th to 29th aspects.

According to the 31st aspect of the present invention, an image-capturing device comprises: an image sensor that captures an image; and an image processing unit that executes an image processing program constituting a computer program product according to the 30th aspect to perform gradation correction of image data corresponding to the image captured by the image sensor.

Advantageous Effect of the Invention

Since the present invention has been constructed as detailed above, most appropriate gradation correction can be performed pixel by pixel, so that adverse influences that would otherwise be generated on the image after the correction can be eliminated.

BRIEF DESCRIPTION OF THE DRAWINGS

FIG. 18 is a flowchart illustrating the processing that an image processing unit performs.

BEST MODE FOR CARRYING OUT THE INVENTION

First Embodiment

Figure 1:
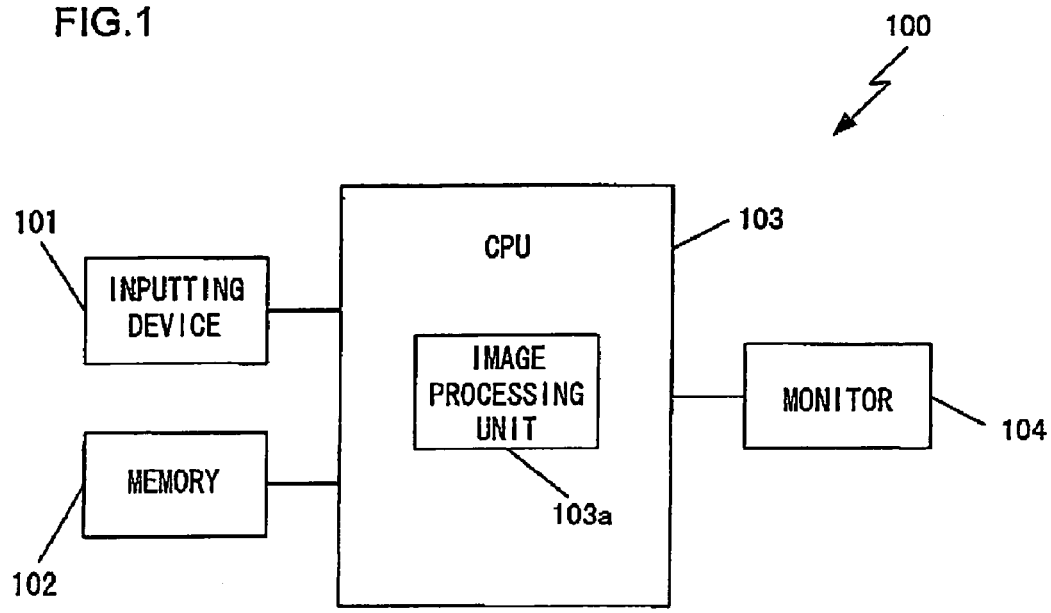
FIG. 1 is a block diagram showing the construction of an image processing device according to a first embodiment of the present invention.

FIG. 1 is a block diagram showing the construction of an embodiment of an image processing device according to one embodiment of the present invention. An image processing device 100 includes an inputting device 101 operated by a user, such as a mouse, a keyboard or an entry switch, a memory 102 that stores image data being a target of image processing and an image processing program, a controlling device 103 that is constituted by a CPU and other peripheral circuits, and a monitor 104 that outputs an image. The image processing device 100 can be constituted by a personal computer.

The image data to be stored in the memory 102 is a data of an image that has been captured by, for example, a digital camera and expressed according to an RGB calorimetric system (primitive color system expression). It is assumed that each pixel that constitutes the image data has color information on all of color components R, G, and B. Here, the term "color information on each of color components R, G, and B" means an intensity signal of each color expressed by 0 to 225 levels; the luminance of each pixel is determined based on the intensity signals of all colors R, G, and B. Hereinafter, each intensity signal of R, G, and B is referred to simply as "K", "G", or "B".

The controlling device 103 includes an image processing unit 103a that reads in an image processing program stored in the memory 102 and performs gradation correction processing on an image. When the inputting device 101 is operated by the user to instruct start of the image processing in a state in which the image, that is, a target of the image processing selected by the user, is displayed on the monitor 104, the image processing unit 103a reads in an image processing program stored in the memory 102 and executes the read-in program. Then, the following processing is applied to the image data, the target of the image processing, to perform gradation correction.

First, based on the RGB data of image data (input RGB image), which are a target of image processing, read in from the memory 102, a luminance value (brightness) V of each pixel is calculated according to the following equation (1). That is, the maximum value of R, G, and B of a pixel on which attention is focused (a target pixel) is calculated as the luminance value of the pixel on which attention is focused. Note that in the following equation (1), R, G, B, and V are standardized to be values that are equal to or more than 0 and equal to or less than 1.

$$V = \max(R, G, B) \quad (1)$$

From the luminance value of each pixel calculated according to the equation (1), two values are obtained according to the following equations (2) and (3) based on two preset gradation conversion characteristics (i.e., gain curves) g1(V) and g2(V), respectively. That is, two values are obtained based on a plurality of gradation conversions having characteristics different from each other. Note that gradation conversion characteristics are also referred to conversion parameters.

$$V1' = g1(V) \quad (2)$$

$$V2' = g2(V) \quad (3)$$

Note that the gradation conversion characteristics g1(V) and g2(V) are represented by curves that are both monotonically increasing, convex upward, and set such that they have respective output-to-input values different from each other. For example, in the present embodiment, g1(V) is set to provide values smaller than those of g2(V) for most values of V.

Next, for a luminance value V(x,y) of any pixel on which attention is focused in the input RGB image, a neighborhood average Vavg(x,y) is calculated. The neighborhood average Vavg(x,y) represents brightness of neighborhood pixels (pixels in the vicinity), for example, an average value of luminance values V of 10×10 pixels around the pixel on which attention is focused. Then, according to the following equation (4), V1' and V2' are weighted based on the neighborhood average Vavg(x,y) to calculate a weighted average of V1' and V2' using a weighting function w(Vavg).

$$V'=w(Vavg)\cdot V1'+(1-w(Vavg))\cdot V2' \quad (4)$$

Figure 3:
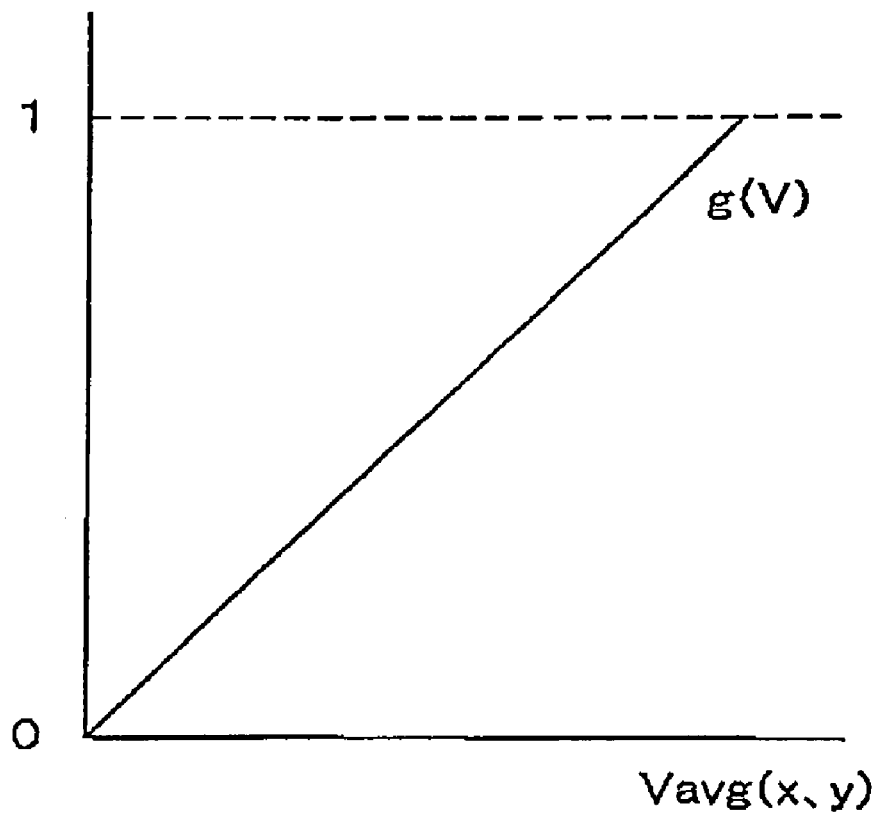
FIG. 3 is a diagram showing a specific example of inputting/outputting characteristics of a weighting function w(Vavg)

The weighting function w(Vavg) used in the present embodiment is a weighting function represented by a monotonically increasing straight line as shown in FIG. 3 and outputs a value of 0 to 1 for an input value of neighborhood average Vavg(x,y). From this it follows that in the equation (4), the darker the neighborhood average Vavg is, and the smaller the w(Vavg) is, the stronger the intensity of correction can be made. That is, the darker the neighborhood average Vavg is, the higher the luminance of the pixel concerned can be corrected to be.

Further, since both the gradation conversion characteristics g1(V) and g2(V) are made to be represented by curves that are monotonically increasing and convex upward so that they can have characteristics similar to each other, an adverse influence such as halo that accompanies the correction can be suppressed by reducing a difference between the gradation conversion characteristics g1(V) and g2(V) even in a region where the neighborhood average Vavg varies to a greater extent and degree of correction varies between adjacent pixels.

A ratio (V'/V) of the value V' obtained according to the equation (4) to the luminance V before the correction is used as a gain coefficient, with which R, G, and B of each pixel in the input RGB image are multiplied to perform gradation correction of the input RGB image. That is, as shown in the following equations (5) to (7), R', G', and B' after gradation correction are calculated and output.

$$R'=R\cdot V'/V \quad (5)$$

$$G'=G\cdot V'/V \quad (6)$$

$$B'=B\cdot V'/V \quad (7)$$

As described above, since R, G, and B of each pixel is subjected to gradation correction based on the value of V' that is determined such that the value of V2' having a greater value for a darker neighborhood average Vavg, is reflected intensely, each pixel can be subjected to gradation correction so that the dark portion of the input RGB image can be made brighter.

Note that upon calculation of R', G', and B' after gradation correction, it may be acceptable, as shown in equations (8) to (10) instead of equations (5) to (7), to set a saturation correction parameter S (0<s≦1) to correct saturation, so that if a chrominance (color difference) is varied, saturation will not be changed.

$$R'=R+V\cdot((V'/V)-1)\cdot(R/V)^S \quad (8)$$

$$G'=G+V\cdot((V'/V)-1)\cdot(G/V)^S \quad (9)$$

$$B'=B+V\cdot((V'/V)-1)\cdot(B/V)^S \quad (10)$$

Figure 4:
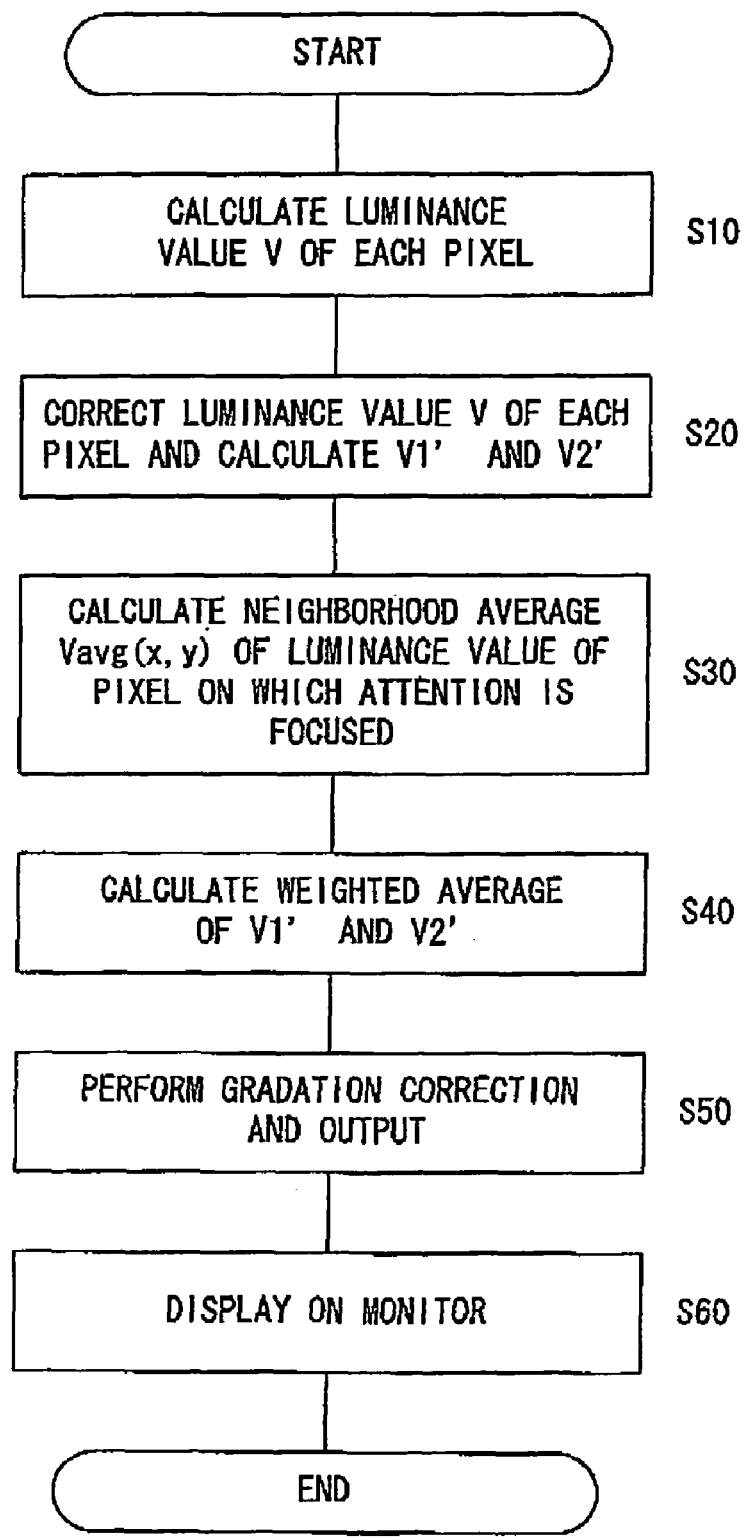
FIG. 4 is a flowchart illustrating the flow of processing by the image processing program in the first embodiment.

FIG. 4 is a flowchart illustrating the flow of processing by the image processing program in the first embodiment. The processing illustrated in FIG. 4 is implemented as follows. That is, when the inputting device 101 is operated by the user to instruct start of image processing, the image processing program is read in by the controlling device 103 from the memory 102 and the read-in image processing program is started up by the image processing unit 103a.

In a step S10, a luminance value V of each pixel is calculated according to the equation (1) and the flow of control proceeds to a step S20. In the step S20, as described above, two values are obtained from the luminance value of each pixel calculated according to the equations (2) and (3) based on the two preset gradation conversion characteristics g1(V) and g2(V). Subsequently, the flow of control proceeds to a step S30 to calculate a neighborhood average Vavg(x,y) for a luminance value V(x,y) of any pixel on which attention is focused. Then, the flow of control proceeds to a step S40

In the step S40, as described above, a weighted average of V1' and V2' corresponding to the neighborhood average Vavg (x,y) are calculated according to the equation (4) using the weighting function w(Vavg) and the flow of control proceeds to a step S50. In the step S50, a ratio of the corrected luminance V' to the luminance before correction V is multiplied to each of R, G, and B of each pixel in the input RGB image to calculate R', G', and B' after gradation correction according to the equations (5) to (7), respectively. Thereafter, the flow of control proceeds to a step S60, in which the image data after gradation correction are output and displayed on the monitor 104 and the flow of control of this routine terminates.

According to the first embodiment of the present invention detailed above, the following effects can be obtained.

(1) For the luminance value V(x,y) of any pixel on which attention is focused in the input RGB image, the neighborhood average Vavg(x,y) is calculated. Using the weighting function w(Vavg), weighting depending on the neighborhood average Vavg(x,y) is performed to calculate a weighted average of values V1' and V2' obtained from the two gradation conversion characteristics g1(V) and g2(V), respectively, represented by curves that are monotonically increasing and convex upward as a value V' for determining a gain. This enables appropriate correction for each region of the image to be performed.

(2) Since the two types of gradation conversion characteristics g1(V) and g2(V) are made to be similar characteristics, an adverse influence such as halo that accompanies the correction can be suppressed by reducing a difference between the gradation conversion characteristics g1(V) and g2(V) even in a region where the neighborhood average Vavg varies to a greater extent and degree of correction varies between adjacent pixels. In addition, as compared with correction using one type of gradation conversion characteristic equally, it is possible to perform finely tuned correction region by region.

(3) A weighting function represented by a monotonically increasing straight line is selected as the weighting function w(Vavg) and set such that it outputs a weighted value of 0 to 1 for an input value of a neighborhood average Vavg(x,y). This enables correction to be performed to appropriate brightness depending on the brightness of the surroundings according to the value of the neighborhood average Vavg.

Second Embodiment

In a second embodiment of the present invention, explanation is made on a case in which gradation correction is performed by preparing a reduced image of the image data read in from the memory 102 and obtaining an average value of luminances near a pixel on which attention is focused using the reduced image. Note that since the block diagram of the image processing device shown in FIG. 1 is one that is the same as that in the first embodiment, description thereof is omitted here.

In the present embodiment, first, reducing (sub-sampling or culling) processing is applied to the image data read in from the memory 102 (input RGB image) to reduce the image to, for example, 1/10 for both vertical and horizontal dimensions. From R, G, and B of the reduced image, a luminance value v of each pixel is calculated according to the equation (1) mentioned of in the first embodiment. Then, LPF processing is applied to the calculated luminance value v of the reduced image. That is, smoothing processing is performed to the reduced image having a luminance value of v to blur the image.

Since it is only necessary to apply LPF processing to the image in a pixel-subsampled state by reducing the image and then applying LPF processing thereto in this manner, a load upon LPF processing can be decreased as compared with that in the case of applying the LPF processing to the input RGB image as it is.

Next, a luminance value v'(x,y) of the reduced image after the LPF processing corresponding to any position (x,y) on the input RGB image is calculated by bilinear interpolation shown by the following equation (11). This makes it possible to calculate the luminance value v'(x,y) after the LPF processing when the reduced image after the LPF processing is restored to the original dimension of the input RGB image. That is, using the data of the reduced image after the LPF processing, the luminance value v' corresponding to any position (x,y) on the input RGB image is obtained. The luminance value v'(x,y) is used as a neighborhood average Vavg(x,y) of a luminance value for a pixel on which attention is focused detailed hereinbelow.

$$v'(x,y) = (1-w)(1-u)V(X_0,Y_0) + (1-w)uV(X_1,Y_0) + w(1-u)V(X_0,Y_1) + uwV(X_1,Y_1) \quad (11)$$

In the equation (11), it is assumed that $X_0 = |x/10|$, $X_1 = |x/10|+1$, $Y_0 = |y/10|$, $Y_1 = |y/10|+1$, $u = \mod(x,10)/10$, and $w = \mod(y,10)/10$.

Then, according to the equation (1) in the first embodiment, a luminance value V(x,y) of each pixel is calculated from an RGB value at any position (x,y) of the input RGB image, and from the calculated luminance value of each pixel, based on two preset gradation conversion characteristics g2(V) and g3(V), two values V2' and V3' are obtained as shown by the following equations (12) and (13), respectively. Here, the above-mentioned reduced image is not used but instead the input RGB image is used.

$$V2' = g2(V) \quad (12)$$

$$V3' = g3(V) \quad (13)$$

Figure 5:
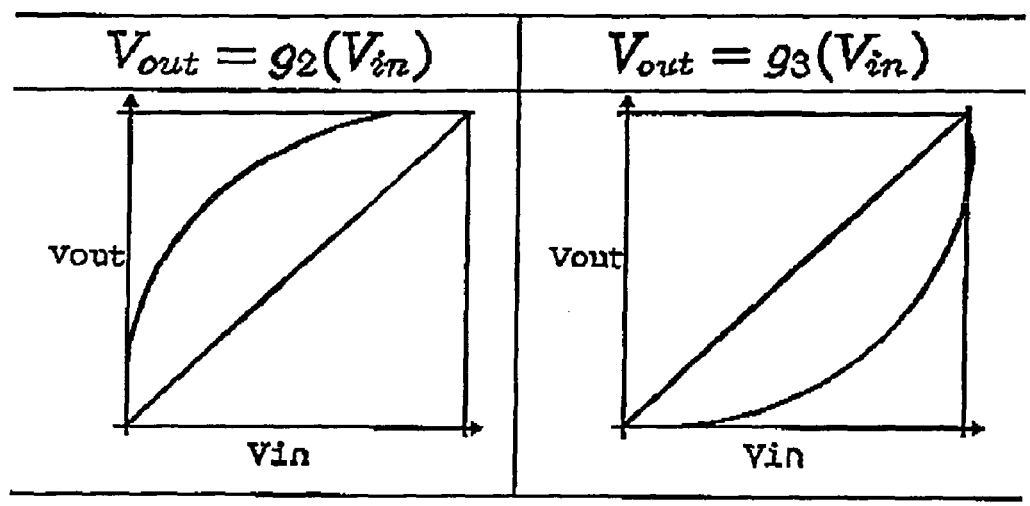
FIG. 5 is a diagram showing specific examples of inputting/outputting characteristics of gradation conversion characteristics g2(V) and g3(V) in a second embodiment of the present invention.

Note that as shown in FIG. 5, the gradation conversion characteristic g2(V) is the same as the gradation conversion characteristic g2(V) in the first embodiment, that is, a gradation characteristic represented by a curve that is monotonically increasing and concave upward while g3(V) is a gradation characteristic represented by a curve that is monotonically increasing and convex downward. In other words, g2(V) has an input-output characteristic suitable for dark side correction while g3(V) has an input-output characteristic suitable for bright side correction.

Next, for the luminance value V(x,y) of any pixel on which attention is focused, a value of its neighborhood average Vavg(x,y) is obtained. As the neighborhood average Vavg(x,y), there is used the value of v'(x,y) that has been previously obtained by the LPF processing and bilinear interpolation as it is. In the present embodiment, a luminance value V for a range that is substantially broader than the calculation range (10×10 pixel) is obtained under a less load. That is, since v'(x,y) is obtained using data having been subjected to smoothing processing (LPF processing) with a reduced image being reduced to 1/10, v'(x,y) itself can be deemed to be an average of luminance values in a range substantially broader than the 10×10 pixel range.

Then, similarly to the first embodiment, a weighting function w(Vavg) is used to perform weighting corresponding to the neighborhood average Vavg(x,y) to calculate a weighted average of V2' (x,y) and V3' (x,y) calculated according to the equations (12) and (13), respectively, by the following equation (14).

$$V' = (1-w(Vavg)) \cdot V2' + w(Vavg) \cdot V3' \quad (14)$$

With this, in the case of pixels having a dark neighborhood average Vavg, w(Vavg) is small to increase the weight of V2' in the equation (14), so that a value V' suitable for dark side correction can be obtained. On the other hand, in the case of pixels having a bright neighborhood average Vavg, w(Vavg) is large to increase the weight of V3' in the equation (14), so that a value V' suitable for bright side correction can be obtained. That is, by increasing the luminance of the dark portion and decreasing the luminance of the bright portion in the image, the whole image can be corrected to natural brightness.

Then, similarly to the first embodiment, a ratio (V'/V) of the luminance V' corrected according to the equation (14) to the luminance V before the correction is selected as a gain coefficient, with which R, G, and B of each pixel in the input RGB image are multiplied according to the equations (5) to (7), respectively, as described above to perform the gradation correction of the input RGB image With this, each of R, G, and B of each pixel is subjected to gradation correction based on the luminance V' obtained by correcting a darker portion in the image to become brighter and a brighter portion in the image to become darker, so that gradation correction of each pixel can be performed such that the input RGB image as a whole is made at natural brightness.

Note that also in the present embodiment, upon calculation of R', G', and B' after gradation correction, it may be acceptable to set a saturation correction parameter S (0<S≦1) to correct saturation by using the equations (8) to (10), instead of equations (5) to (7), so that if a chrominance (color difference) is varied, saturation will not be changed.

Figure 6:
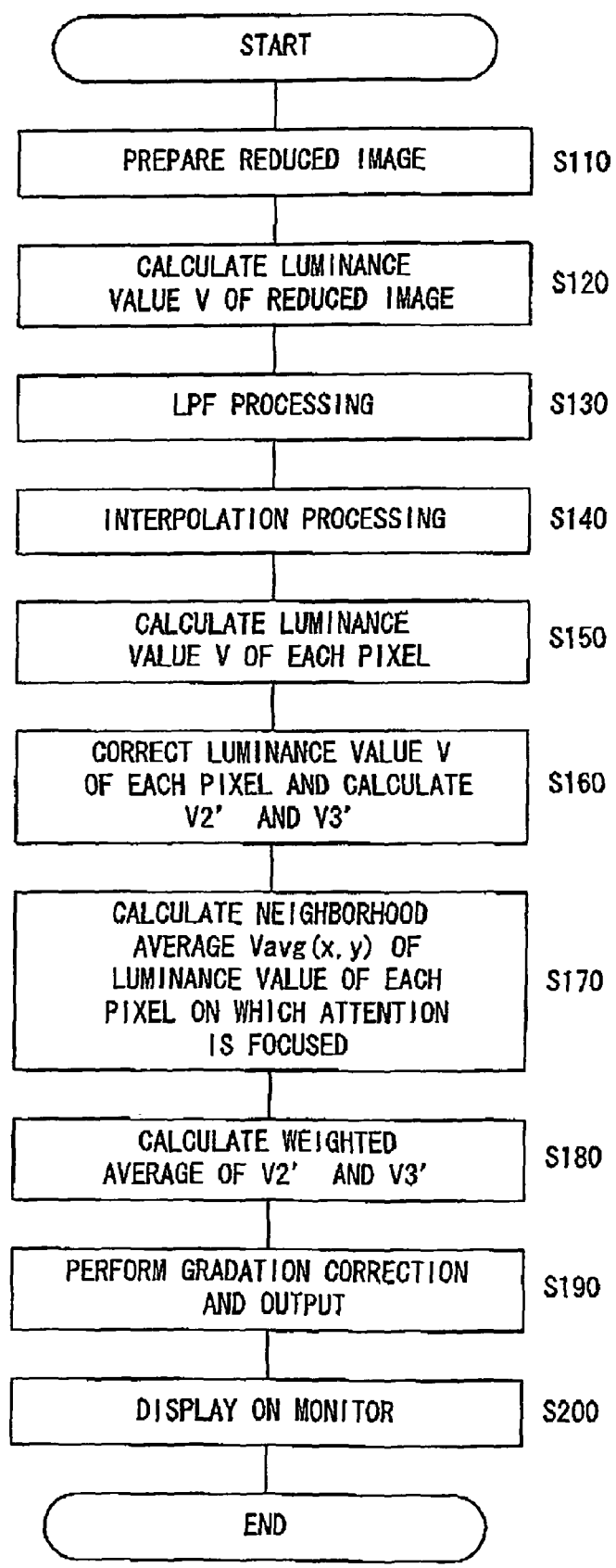
FIG. 6 is a flowchart illustrating the flow of processing by the image processing program in the second embodiment.

FIG. 6 is a flowchart illustrating the flow of processing by the image processing program in the second embodiment. The processing illustrated in FIG. 6 is implemented as follows. That is, when the inputting device 101 is operated by the user to instruct start of image processing, the image processing program is read in by the controlling device 103 from the memory 102 and the read-in image processing program is started up by the image processing unit 103a.

In a step S110, a reduced image is prepared by reducing the input RGB image to, for example, a 1/10 size in both vertical and horizontal dimensions. Subsequently, the flow of control proceeds to a step 120 to calculate a luminance value V of each pixel from R, G, and B of the reduced image according to the equation (1) and the flow of control proceeds to a step S130. In the step S130, the image having the calculated luminance value V is subjected to LPF processing to perform smoothing to blur the image. Subsequently, the flow of control proceeds to a step S140.

In the step S140, a luminance value v'(x,y) of the reduced image after LPF processing corresponding to a position (x,y) on the input RGB image is calculated by, for example, bilinear interpolation according to the equation (11) described above. Subsequently, the flow of control proceeds to a step S150 to calculate a luminance value V(x,y) of each pixel from R, G, and B values on the position (x,y) in the input RGB image, and the flow of control proceeds to a step S160.

In the step S160, as described above, a luminance value of each pixel is corrected based on the two preset gradation conversion characteristics g2(V) and g3(V) according to the equations (12) and (13), respectively. Subsequently, the flow of control proceeds to a step S170 to replace a luminance value V(x,y) of any pixel on which attention is focused by a value of v'(x,y) of which neighborhood average Vavg(x,y) is obtained in advance, and the flow of control proceeds to a step S180. In the step S180, as described above, a weighted average of V2' and V3' depending on the neighborhood average Vavg(x,y) is calculated according to the equation (14) using the weighting function w(Vavg), and the flow of control proceeds to a step S190.

In the step S190, each of R, G, and B of each pixel is multiplied by a ratio of the obtained value V' to the luminance V before the correction to calculate R', G', and B' after gradation correction according to the equations (5) and (7), respectively. Subsequently, the flow of control proceeds to a step S200 to output and displays the image data after gradation correction on the monitor 104, and the flow of control of this routine terminates.

According to the second embodiment detailed above, in addition to the effects in the first embodiment, the following effects can be obtained.

(1) Using the weighting function w(Vavg), weighting depending on the neighborhood average Vavg (x,y) is performed to calculate a weighted average of the luminance V2' and the luminance V3' obtained by correction with gradation conversion characteristic g2(V) represented by a curve that is monotonically increasing and convex upward and gradation conversion characteristic g3(V) represented by a curve that is monotonically increasing and convex downward, respectively, as a value of the luminance V' after correction. With this, gradation of R, G, and B of each pixel can be performed based on the luminance V' obtained by correcting a darker portion in the image to become brighter and a brighter portion in the image to become darker, so that gradation correction of each pixel can be performed such that the input RGB image as a whole is made at natural brightness.

(2) From R, G, and B of the reduced image, a luminance value v of each pixel is calculated and then LPF processing is applied to blur the image, and gradation correction is performed based on the result thereof. With this, it becomes only necessary to apply LPF processing to the image in a pixel-subsampled state, so that a load upon LPF processing can be decreased as compared with that in the case of applying LPF processing to the input RGB image as it is.

Note that since in the second embodiment, there are used widely differing gradation conversion characteristics such as gradation conversion characteristic g2(V) represented by a curve that is monotonically increasing and convex upward and gradation conversion characteristic g3(V) represented by a curve that is monotonically increasing and convex downward, correction tends to cause unnatural, adverse influences such as halo. To prevent such an adverse influence, it is preferred that variation in neighborhood average Vavg(x,y) by the position of pixel is made smaller than that in the first embodiment. For this purpose, it is only necessary to increase the degree of smoothing by the LPF.

Third Embodiment

In a third embodiment of the present invention, explanation is made on a case in which R, G, and B of each pixel of an input RGB image are subjected to gradation correction using a G pixel value that represents a luminance of each pixel in the RGB image to correct gradation of the input RGB image. Note that since the block diagram of the image processing device shown in FIG. 1 is one that is the same as that in the first embodiment, description thereof is omitted here. In each pixel in the input RGB image, color information on all color components of R, G, and B, that is, color component values are present.

Figure 7:
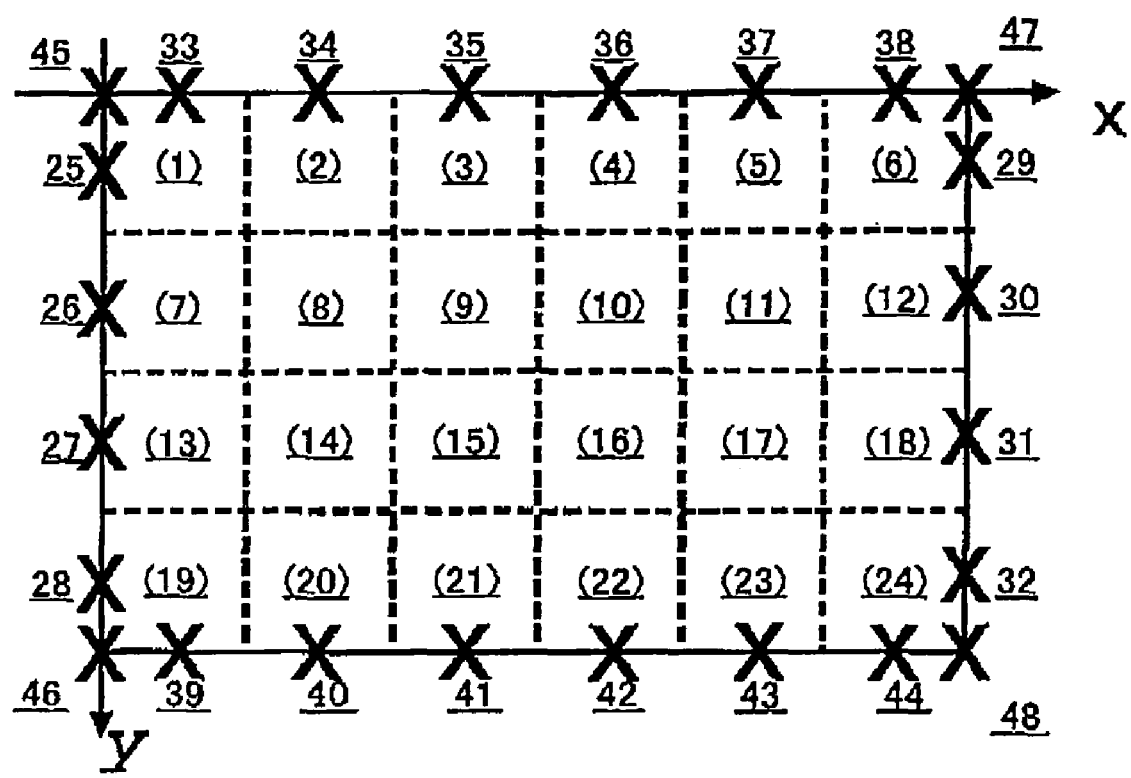
FIG. 7 is a diagram showing an example in which an imaging plane of an input RGB image is divided into 6×4 in a third embodiment of the present invention.

The image processing unit 103a calculates a luminance evaluation value as brightness of neighborhood pixels of each pixel in the input RGB image. For this purpose, the imaging plane is divided into, for example, 6×4 regions as shown in FIG. 7, and an average luminance value of each of the 6×4 regions is calculated. The average luminance value is obtained by calculating an average of the values of G in each of the regions. The average luminance value in each region may be subjected to gamma processing. Then, a surface z(x,y) represented by the following equation (15) approximating a luminance distribution of the 6×4 regions is calculated by a least-squares method. Using the surface z(x,y) represented by the equation (15), luminance evaluation values at respective positions of pixels of the input RGB image are calculated.

$$z = k_1 x^3 + k_2 x^2 y + k_3 x^2 + k_4 xy^2 + k_5 xy + k_6 x + k_7 y^3 + k_8 y^2 + k_9 y + k_{10} + k_{11} x^4 + k_{12} x^3 y + k_{13} x^2 y^2 + k_{14} xy^3 + k_{15} y^4 \quad (15)$$

Note that in the example shown in FIG. 7, to make the inclination of an approximation surface upon calculating a surface not large, quasi-sample points 25 to 48 (numeric characters not surrounded by brackets "( )") are set on the periphery of 6×4 sample points (1) to (24) (numerical characters surrounded by brackets "( )") and each of the values of quasi-sample points 25 to 48 is made to be identical to the value of a sample point close to each quasi-sample point. For example, quasi-sample point 33 has the same value z as sample point (1) while quasi-sample point 48 has the same value z as sample point (24). Here, an example is shown in which luminance evaluation values in each pixel of the input RGB image are calculated based on the surface calculated according to the equation (15). However, the luminance evaluation value of each pixel in the input RGB image can be calculated by using a maximum value of R, G, and B; a weighted addition of R, G, and B; a G pixel value; or a value L of Lab colorimetric system calculated from RGB values.

Next, a luminance G of any pixel on which attention is focused on the input RGB image is calculated and the calculated luminance G is corrected based on two preset gradation conversion characteristics f (G) and g (G) to calculate a first corrected luminance G1 and a second corrected luminance G2, respectively. In the present embodiment, as described above, the luminance of a pixel on which attention is focused is to be evaluated using a G pixel value.

For example, the first corrected luminance G1 and the second corrected luminance G2 are calculated according to the following equations (16) and (17), respectively, using the first gradation conversion characteristics f (G) represented by a curve that is monotonically increasing and convex upward as shown in FIG. 8(a) and the second gradation conversion characteristics g(G) represented by a curve that is monotonically increasing and convex downward as shown in FIG. 8(b), respectively. Note that at least one of the first gradation conversion characteristic f(G) and the second gradation conversion characteristic g(G) may be identical transformation.

$$G1=f(G) \quad (16)$$

$$G2=g(G) \quad (17)$$

Figure 8:
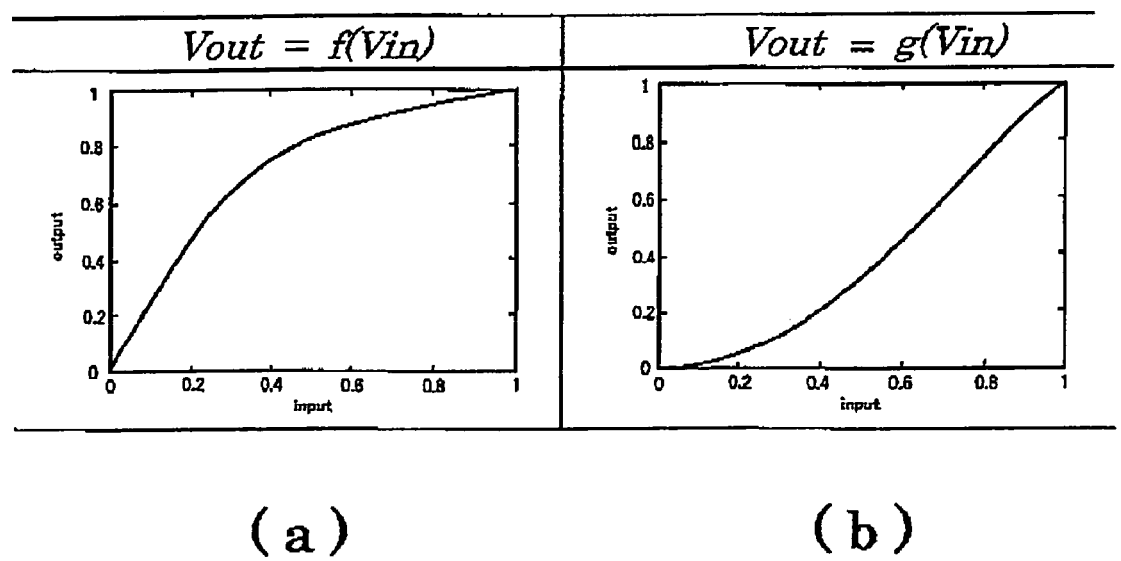
FIG. 8 is a diagram showing specific examples of a first gradation conversion characteristic f(G) and a second gradation conversion characteristic g(G) in the third embodiment.

Note that although in the graphs shown in FIG. 8 illustrating gradation conversion characteristics f(G) and g (G), inputs and outputs are shown in the range of 0 to 1 for descriptive purposes, this range may be 0 to 255 or 0 to 4095 for both the inputs and outputs. Further, it would be acceptable to set the range of inputs to a range of 0 to 4095 and the range of outputs to a range of 0 to 255. The correction may be performed using an LUT.

For the luminance G(x,y) at a position (x,y) of a pixel on which attention is focused and calculated by the above-mentioned processing, its neighborhood average Gavg(x,y) is calculated using the equation (15). That is, Gavg(x,y)=z(x,y). Then, depending on the calculated neighborhood average Gavg(x,y), a weighted average of G1 and G2 is calculated. That is, using a monotonically increasing weighting function ω (Gavg) such that 0≦ω(Gavg)≦1, a weighted average G' of G1 and G2 is calculated according to the following equation (18).

$$G'=(1-\omega)(Gavg))\cdot G1+\omega(Gavg)\cdot G2 \quad (18)$$

With the corrected value G' of G calculated according to the equation (18), correction can be performed such that the darker the neighborhood average Gavg is, the stronger the characteristic of f(G) is to make the darker portion brighter. On the other hand, correction may be performed such that the brighter the neighborhood average Gavg is, the stronger the characteristic of g(G) is to prevent gradation failure even in the bright portion.

Figure 9:
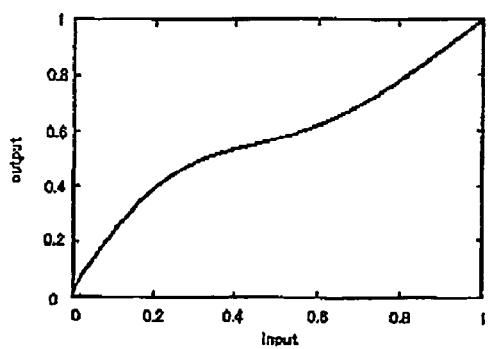
FIG. 9 is a diagram showing a specific example of a third gradation conversion characteristic in the third embodiment.

Note that the weighting function may depend not only on the average neighborhood luminance Gavg but also on the luminance G of the pixel on which attention is focused. For example, by setting 0≦Gavg, G≦1 and ω(Gavg,G)=(Gavg+G)/2, when the luminance of the pixel on which attention is focused is low, it is possible to increase the effect of correcting brighter. Further, it may be set that ω(Gavg,G)=(Gavg+G²)/2. Furthermore, it would be acceptable to set a third gradation conversion characteristic G3 as shown in FIG. 9 and obtaining a weighted average of the third corrected luminance G3 calculated according to the third gradation conversion characteristic and the corrected value G' obtained by correction according to the equation (18) in a predetermined ratio to calculate a finally corrected luminance value G".

Next, a ratio (G'/G) of the corrected value G' calculated according to the equation (18) to G is set as a gain coefficient and gradation correction of R and B of each pixel therewith is performed. That is, R' and B' after gradation correction are calculated according to the following equations (19) and (20), respectively.

$$R'=R\cdot G'/G \quad (19)$$

$$B'=B\cdot G'/G \quad (20)$$

In this way, gradation correction of R and B can be performed using G and G' that is the result of gradation correction of G. In other words, based on color component G contained in the input RGB image, gradation correction of other color components R and G can be performed. As a result, a load on the processing can be decreased as compared with that gradation correction of each of R, G, and B is performed based on the luminance value V and its corrected value V' in the first and second embodiments.

Figure 10:
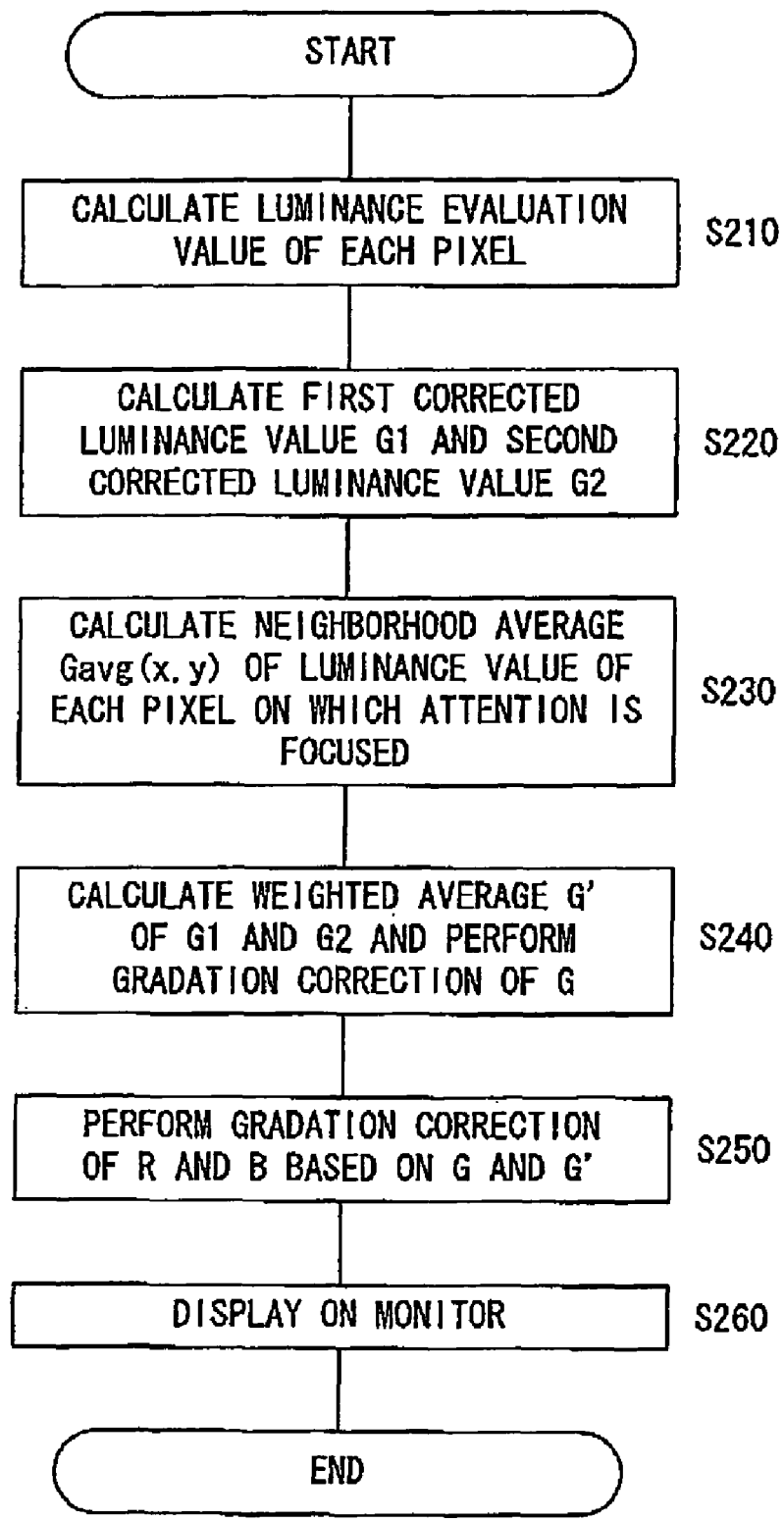
FIG. 10 is a flowchart illustrating the flow of processing by the image processing program in the third embodiment.

FIG. 10 is a flowchart illustrating the flow of processing by an image processing program in the third embodiment. The processing illustrated in FIG. 10 is implemented as follows. That is, when the inputting device 101 is operated by the user to instruct start of image processing, the image processing program is read in by the controlling device 103 from the memory 102 and the read-in image processing program is started up by the image processing unit 103a.

In a step S210, the image processing unit 103a calculates a luminance evaluation value of each pixel in the input RGB image using the surface calculated according to the equation (15) as described above. That is, the value calculated according to the equation (15) is defined as a luminance evaluation value. Subsequently, the flow of control proceeds to a step S220 to calculate a luminance G for any pixel on which attention is focused on the input RGB image and correct the calculated luminance G in different ways according to the equations (16) and (17) based on two gradation conversion characteristics f (G) and g (G), respectively, that are prepared in advance to obtain a first corrected luminance G1 and a second corrected luminance G2, respectively. Subsequently, the flow of control proceeds to a step S230.

In the step S230, for luminance G(x,y) at a position (x,y) of the pixel on which attention is focused, its neighborhood average Gavg(x,y) is calculated using the equation (1), and the flow of control proceeds to a step S240. As described above, it is assumed that Gavg(x,y)=z(x,y). In the step S240, a weighted average G' of G1 and G2 corresponding to the neighborhood average Gavg(x,y) calculated according to the equation (18) is calculated.

Subsequently, the flow of control proceeds to a step S250 to set the calculated value G' of corrected G to G as a gain coefficient and calculate R' and B' after gradation correction according to the equations (19) and (20), respectively. Then, the flow of control proceeds to a step S260 to output and display the image data after gradation correction to and on the monitor 104.

According to the third embodiment detailed above, in an input RGB image, gradation corrected value G' is calculated using a G pixel value that represents the luminance of each pixel while R and B are subjected to gradation correction by multiplying them with a gain coefficient calculated as a ratio of G' to G. This results in that a load on the processing can be decreased as compared with the first and second embodiments in which gradation correction of each of R, G, and B is performed based on the luminance value V and its corrected value V'.

Fourth Embodiment

In a fourth embodiment of the present invention, explanation will be made on a method of performing gradation correction in which when a Bayer image is input as image data as a target of gradation correction, a pixel value of each pixel is corrected. The image sensor of a digital camera that captures the image used in the present embodiment includes a color filter arranged for each pixel and is sensitive to one of light of R, G or B. That is, R, G, and B color filters are in a Bayer arrangement. It is assumed that the image captured by this image sensor is a Bayer image expressed according to an RGB calorimetric system. It is also assumed that in each of the pixels that constitute the image data, there exists color information on any one of color components of R, G, and B.

Note that since the block diagram of the image processing device shown in FIG. 1 is the same as that in the first embodiment, description thereof is omitted here.

Figure 11:
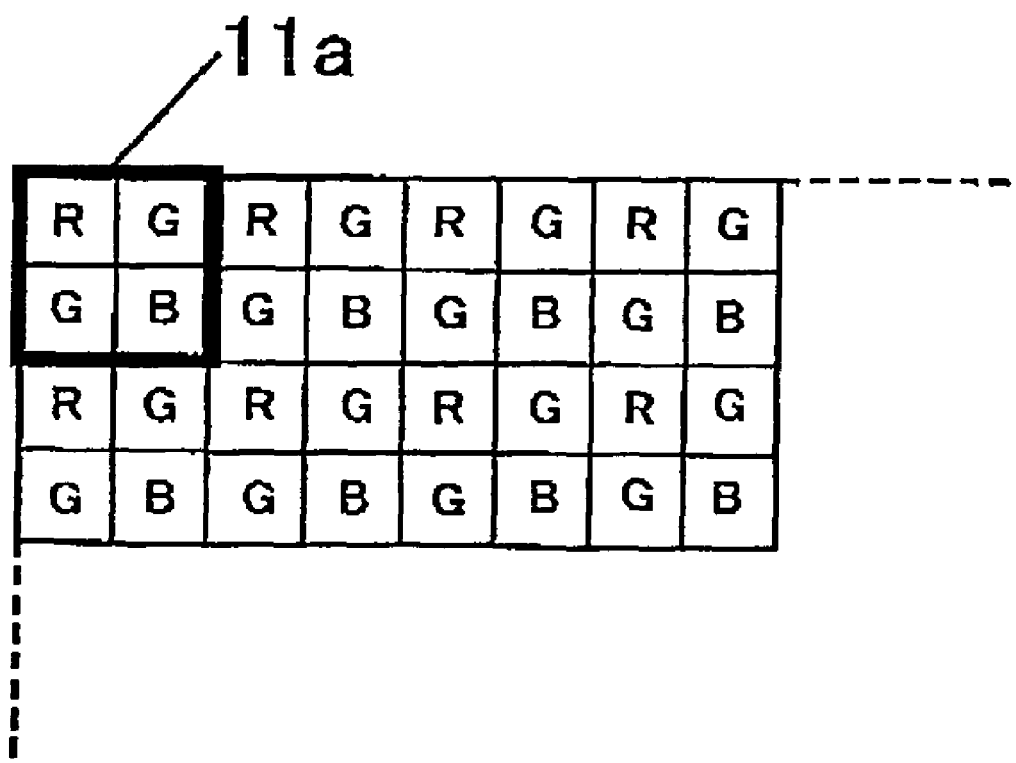
FIG. 11 is a diagram illustrating the arrangement of R, G, and B color filters in a Bayer array.

FIG. 11 is a diagram illustrating the arrangement of R, G, and B color filters in a Bayer array. As shown in FIG. 11, there exists, in each pixel that constitutes the image data, color information on any one of color components of R, G, and B, that is, a color component value (a value corresponding to a signal value of CCD).

The image processing unit 103a, when the inputting device 101 is operated by the user to instruct start of the image processing in a state in which the image that is a target of the image processing selected by the user is displayed on the monitor 104, reads in from the memory 102 an image processing program stored therein and executes the read-in program. Subsequently, the image processing unit 103a reads in Bayer image data (input Bayer image), which is a target of image processing, from the memory 102 and calculates a luminance evaluation value in a resolution of 256×256 in the input RGB image. In concrete terms, the image processing unit 103a divides the imaging plane into 256×256 regions and calculates an average of luminances of G pixels in each of the regions to define a luminance evaluation value. Then, a surface z(x,y) approximating the calculated luminance evaluation values according to the equation (15) mentioned in the third embodiment. Note that similarly to the third embodiment, the imaging plane may be divided into 6×4 regions before the approximation surface z(x,y) can be calculated.

Next, the input Bayer image is divided into 2×2 blocks. That is, in FIG. 11, the input RGB image is divided into 2×2 blocks indicated by reference numeral 11a, each including two G pixels and one B pixel and one R pixel. Note that the two G pixels included in each block is a G pixel in the row B, i.e., a $G_B$ pixel and a G pixel in the row R, i.e., a $G_R$ pixel. Then, with each of the divided 2×2 blocks, correction of the pixel value of each pixel is performed.

Hereinafter, explanation will be made on the case where correction of pixel values is performed by selecting any one block as a target block. By executing the following processing for the target block detailed below to all of the 2×2 blocks, correction of pixel values can be performed for each pixel of the whole input Bayer image.

First, in a target block, any one of the values (A) to (D) is calculated as a luminance evaluation value G0 for the target block.

(A) An average value of luminance evaluation values of two G pixels in a target block, that is, an average value of luminance evaluation values of the $G_B$ pixel and a luminance evaluation value of the $G_R$ pixel;

(B) A maximum value of luminance evaluation values of two G pixels in a target block, that is, a maximum value of a luminance evaluation value of the $G_B$ pixel and a luminance evaluation value of the $G_R$ pixel;

(C) A maximum value among luminance evaluation values of four pixels in a target block, that is, a maximum value among a luminance evaluation value of the $G_B$ pixel, a luminance evaluation value of the $G_R$ pixel, a luminance evaluation value of the B pixel, and a luminance evaluation value of the R pixel; and (D) A maximum value of each luminance evaluation value among luminance evaluation values of the $G_B$ pixel, the $G_R$ pixel, a $C_1 \times B$ pixel, and a $C_2 \times R$ pixel in a target block. Note that $C_1$ and $C_2$ are white balance coefficients; for example, $C_1=2$ and $C_2=1.5$ are set.

Which one of the methods (A) to (D) is to be used to calculate the luminance evaluation values of the target block is set by the image processing program in advance. In the present embodiment, the luminance evaluation value of G0 of the target block is calculated by, for example, the method (A) above.

Then, based on two preset gain characteristics corresponding to the calculated luminance evaluation value G0 of the target block, for example, f' (G0) shown in FIG. 12(a) and g' (G0) shown in FIG. 12(b), a first gain coefficient m1 and a second gain coefficient m2 are calculated. Note that gain coefficients are also termed as conversion parameters.

$$m1=f'(G0) \tag{21}$$

$$m2=g'(G0) \tag{22}$$

Note that upper limits may be assigned to the gain characteristics f'(G0) and g'(G0), respectively, so that they will not be too great.

Next, based on a central coordinate of the target block and the approximation surface z(x,y) calculated by the above-mentioned processing, a neighborhood average luminance evaluation value G0avg in the target block is calculated. Corresponding to the calculated neighborhood luminance evaluation value G0avg, m1 and m2 are averaged with weighting to calculate a third gain coefficient m3. That is, using a monotonically increasing weighting function ω(G0avg) in which 0≦ω(G0avg)≦1 is satisfied, the third gain coefficient m3 is calculated according to the following equation (23).

$$m3=m1 \cdot (1-\omega(Gavg))+m2 \cdot \omega(Gavg) \tag{23}$$

The pixel value of each pixel is corrected by multiplying the pixel value of each pixel in the target image by the third gain coefficient m3 calculated according to the equation (23). That is, the pixel values of $G_B$, $G_R$, B, and R for the target block are corrected according to the following equations (24) to (27), respectively, to output pixel values of $G'_B$, $G'_R$, B', and R' after the correction.

$$G'_B=m3 \cdot G_B \tag{24}$$

$$G'_R=m3 \cdot G_R \tag{25}$$

$$B'=m3 \cdot B \tag{26}$$

$$R'=m3 \cdot R \tag{27}$$

As described above, by executing the processing for the target block to all the blocks, correction of the pixel value is performed for each pixel in the whole input Bayer image to perform gradation correction of the input RGB image.

Figure 13:
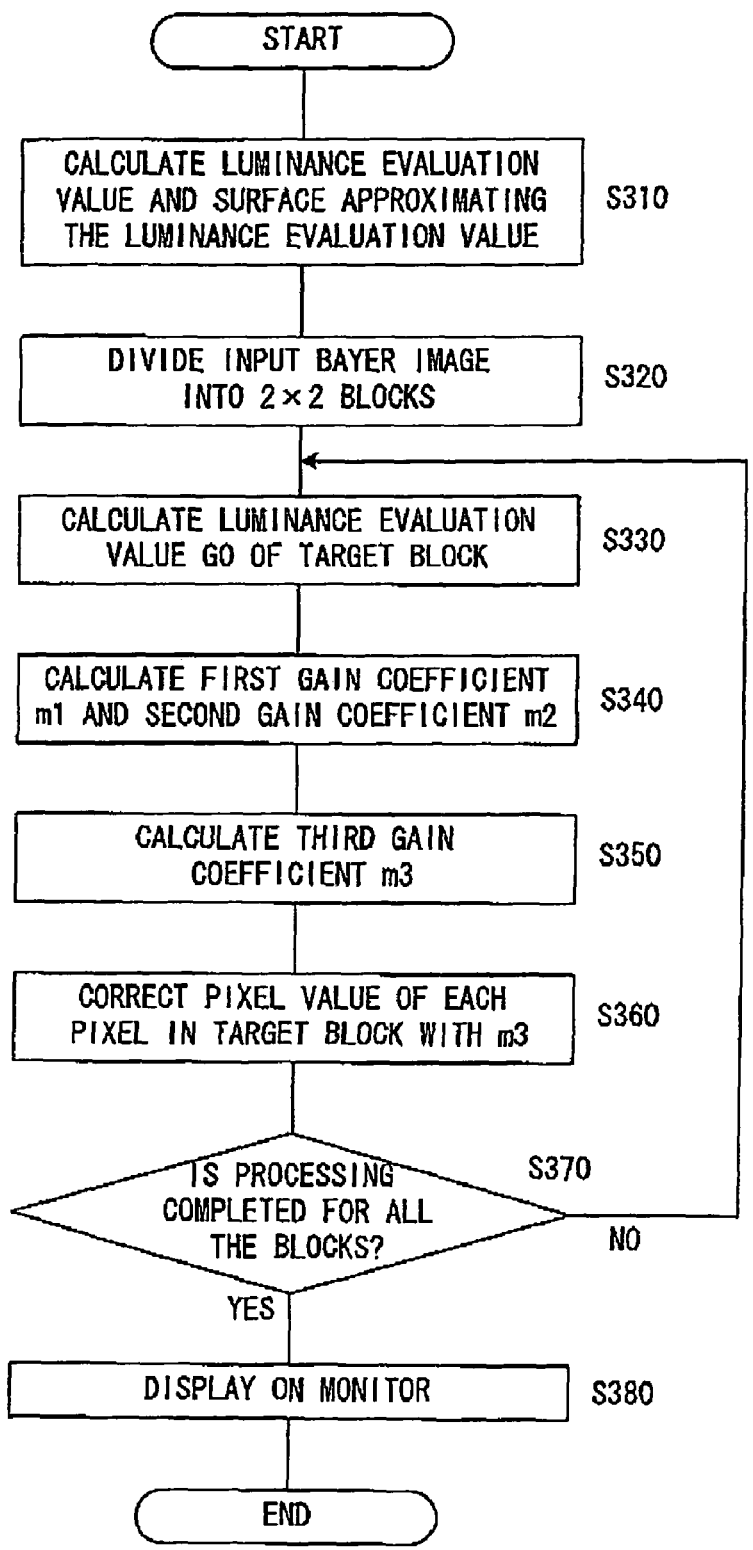
FIG. 13 is a flowchart illustrating the flow of processing by the image processing program in the fourth embodiment.

FIG. 13 is a flowchart illustrating the flow of processing of the image processing program according to the fourth embodiment. The processing illustrated in FIG. 13 is implemented as follows. That is, when the inputting device 101 is operated by the user to instruct start of image processing, the image processing program is read in by the controlling device 103 from the memory 102 and the read-in image processing program is started up by the image processing unit 103a.

In a step S310, as described above, luminance evaluation values having a resolution of 256×256 in the input RGB image are calculated. Then, an approximation surface z(x,y) that approximates the calculated luminance evaluation values is calculated. Subsequently, the flow of control proceeds to a step S320. In the step S320, the input Bayer image is divided into 2×2 blocks each including two G pixels and one B pixel and one R pixel. Thereafter, the flow of control proceeds to a step S330.

Figure 12:
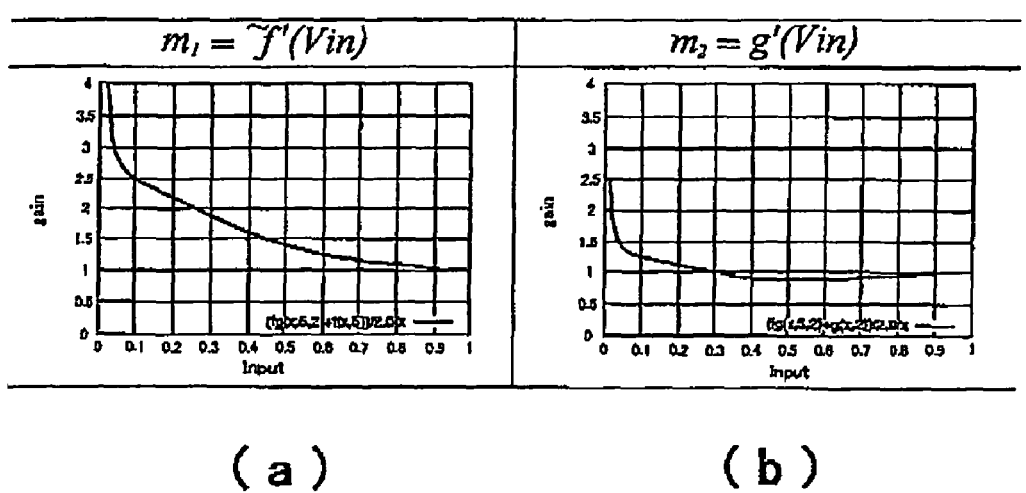
FIG. 12 is a diagram showing specific examples of two gain characteristics in a fourth embodiment of the present invention.

In the step S330, the luminance evaluation value G0 of the target block is calculated by any one of the methods (A) to (D) described above Subsequently, the flow of control proceeds to a step S340 to calculate the first gain coefficient m1 and the second gain coefficient m2 based on the two gain characteristics f' (G0) and g'(G0), respectively, shown in FIG. 12 according to the equations (21) and (22), respectively, and the flow of control proceeds to a step S350.

In the step S350, based on a central coordinate of the target block and the approximation surface z(x,y), a neighborhood average luminance evaluation value G0avg in the target block is calculated. Then, corresponding to the calculated neighborhood luminance evaluation value g0avg, m1 and m2 are averaged with weighting to calculate a third gain coefficient m3 according to the equation (23). Subsequently, the flow of control proceeds to a step S360.

In the step S360, the pixel value of each pixel is corrected by multiplying the pixel value of each pixel in the target image by the third gain coefficient m3 according to the equations (24) to (27), respectively, to correct the pixel value of each pixel to obtain pixel values of $G'_B$, $G'_R$, B', and R' after the correction.

Subsequently, the flow of control proceeds to a step S370 to judge whether or not the processing in the steps S330 to S360 described above is implemented to all the blocks in the input Bayer image. If it is judged that there is any block on which the processing is unfinished, the flow of control returns back to the step S330 to repeat the processing. On the contrary, if it is judged that the processing is finished on all the blocks, the flow of control proceeds to a step S380 to output and displays image data after the correction to and on the monitor 104, and the flow of control of this routine terminates.

According to the fourth embodiment detailed above, the first gain coefficient m1 and the second gain coefficient m2 are calculated based on a plurality of preset gain characteristics, that is, two gain characteristics f' (G0) and g' (G0), as the plurality of values. Then, m1 and m2 are averaged with weighting corresponding to the neighborhood average luminance evaluation value G0avg of the target block to calculate the third gain coefficient m3 for use in the correction of each pixel. This results in that as described in the first to third embodiments, it is unnecessary to calculate a plurality of values based on gradation conversion, so that a load on the processing can be decreased.

Fifth Embodiment

In a fifth embodiment, similarly to the fourth embodiment, explanation will be made on the case in which a Bayer image is input as image data as a target for gradation correction. Note that since the block diagram of the image processing device shown in FIG. 1 is one that is the same as that in the first embodiment, description thereof is omitted here.

In the present embodiment, the input Bayer image includes data of an exposure correction value upon image capturing in the image data. That is, the digital camera that has captured the input Bayer image is configured to allow an exposure correction value to be set upon the image capturing and when an image is captured, store the set exposure correction value as included in the image data. In the present embodiment, although explanation has been made on the case where data of the exposure correction value upon image capturing are included in the image data, the data of exposure correction value may be stored in the memory 102 in relation to the image data.

The image processing unit 103a, similarly to the third embodiment, divides the imaging plane of the input Bayer image into 6×4 regions and calculates a luminance evaluation value of each of the 6×4 regions. Then, the image processing unit 103a corrects the calculated luminance evaluation value in each region based on the exposure correction value included in the image data, and calculates a surface that approximates the corrected luminance evaluation values.

For this purpose, the image processing unit 103a multiplies the luminance evaluation value of each region by a multiplicative factor depending on the image format of the input Bayer image. For example, in the case of image data in which a luminance value and a pixel value are in a proportional relationship (linear relationship), such as RAW data, if an exposure correction value is −1 stop, the luminance evaluation value in each region is doubled while if the exposure correction value is +1 stop, the luminance evaluation value in each region is made half (½). Note that in the case where the luminance value and the pixel value are not in a proportional relationship, as in the format type of SRGB, the luminance evaluation value in each region is multiplied by a multiplicative factor depending on the image format.

Then, a surface approximating the luminance evaluation values is calculated based on the corrected luminance evaluation value in each region in a manner similar to that in the third embodiment. In a manner similar to that in the four the embodiment detailed above, the pixel value of each pixel in the input Bayer image is corrected to perform gradation correction of the input Bayer image. This can prevent gradation correction from counteracting exposure correction despite the image capturing in a digital camera with the exposure correction set to be rather darker or brighter.

Figure 14:
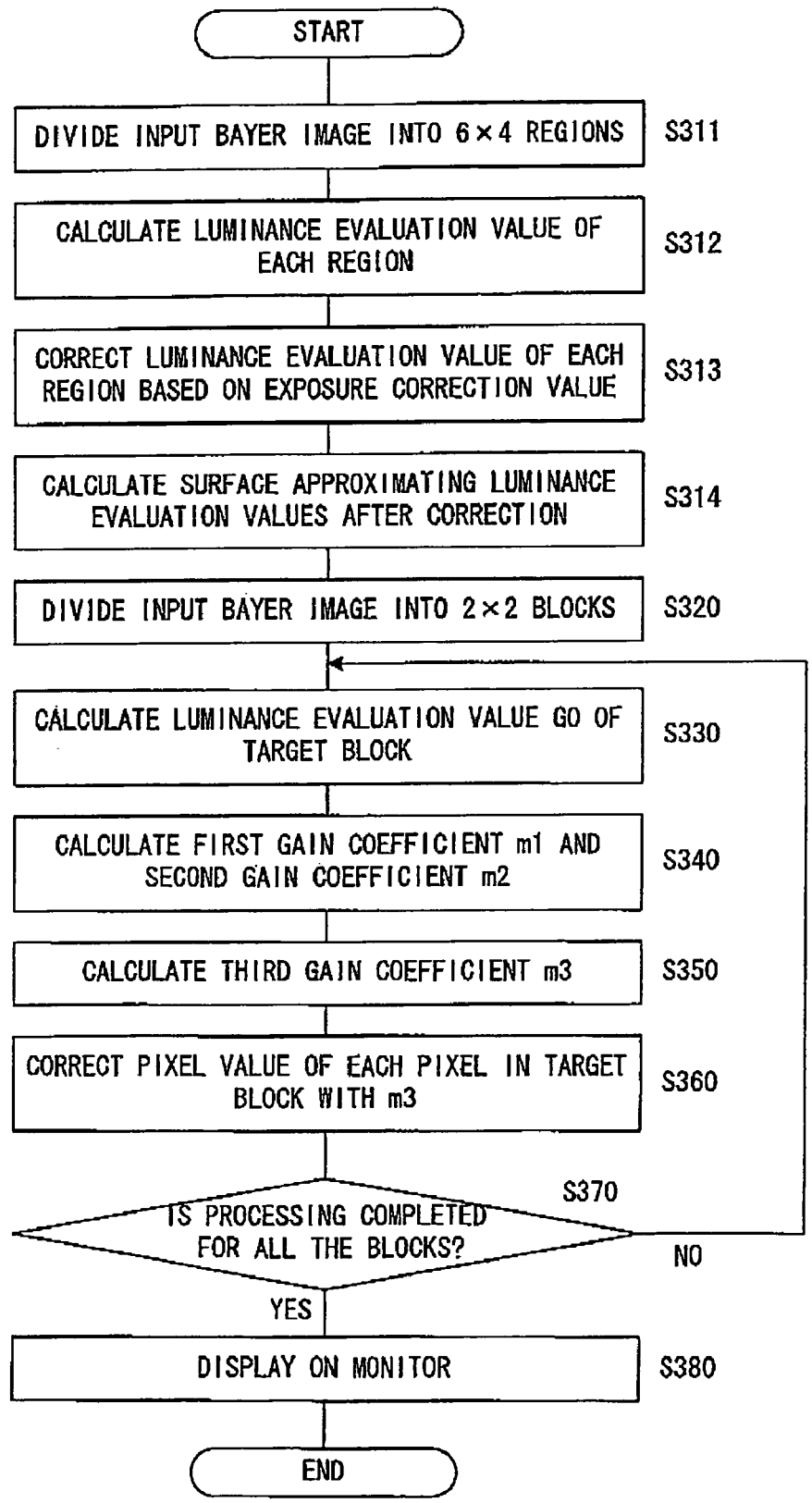
FIG. 14 is a flowchart illustrating the flow of processing by the image processing program in a fifth embodiment of the present invention.

FIG. 14 is a flowchart illustrating the flow of processing by an image processing program in the fifth embodiment. The processing illustrated in FIG. 14 is implemented as follows. That is, when the inputting device 101 is operated by the user to instruct start of image processing, the image processing program is read in by the controlling device 103 from the memory 102 and the read-in image processing program is started up by the image processing unit 103a. Note that in FIG. 14, the content of processing that is the same as that of the processing by the image processing program in the fourth embodiment shown in FIG. 13 is assigned the same step number and explanation is focused on differences therebetween.

In a step S311, the imaging plane of the input Bayer image is divided into 6×4 regions and the flow of control proceeds to a step S312. In the step S312, a luminance evaluation value of each of the 6×4 regions is calculated. Subsequently, the flow of control proceeds to a step S313 to correct the luminance evaluation value in each region based on the exposure correction value included in the image data as described above, and the flow of control proceeds to a step S314. In the step S314, a surface approximating the corrected luminance evaluation values is calculated and the flow of control proceeds to a step S320. The step S320 and steps subsequent thereto are the same as those in the fourth embodiment.

According to the fifth embodiment detailed above, gradation correction can be prevented from counteracting exposure correction despite the fact that the image has been captured by the digital camera with the exposure correction being set to be rather darker or brighter.

Variation

Note that the image processing devices according to the embodiments detailed above may be modified as follows.

(1) In the first and second embodiments described above, explanation has been made on the examples in which the luminance value V of each pixel is calculated according to the equation (1). However, the present invention should not be construed as being limited thereto and it would be also acceptable to perform the calculation according to, for example, the following equation (28) or (29). Note that in the following equations (28) and (29), Y represents a luminance in image data of a YCbCr format (luminance and chrominance expression) and |Cb| and |Cr| represent absolute values of chrominances (color differences) Cb and Cr, respectively.

$$V = Y = 0.3R + 0.6G + 0.1B \quad (28)$$

$$V = Y + |Cb| + |Cr| \quad (29)$$

Note that it would be also acceptable to calculate luminance according to the following equation (30) to make evaluation such that the brightness is decreased for skin color while it is increased for blue sky, so that correction is made so as to correct the skin color brighter and the blue color deeper.

$$V=(R+2G+2B)/5 \qquad (30)$$

Figure 2:
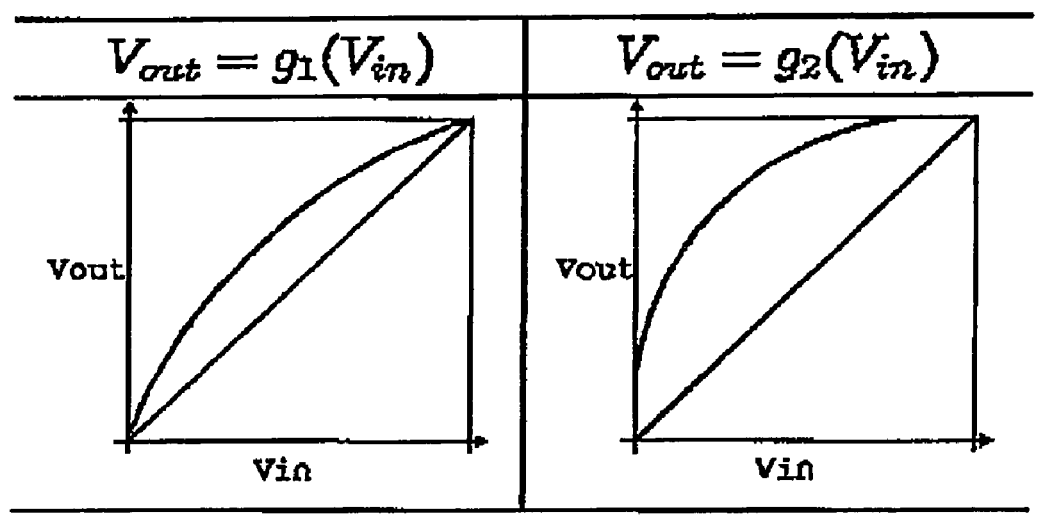
FIG. 2 is a diagram showing specific examples of inputting/outputting characteristics of gradation conversion characteristics g1(V) and g2(V) in the first embodiment.

(2) In the first embodiment detailed above, explanation has been made on the example in which the gradation conversion characteristics g1(V) and g2(V) are each represented by a curve that is monotonically increasing and concave upward as shown in FIG. 2, with their output being set to be different in magnitude than their input. However, the present invention should not be construed as being limited thereto and g2(V) may be a composite function of g1(V) and g'1(V), that is, g2(V)=g'1(g1(V)).

(3) In the first embodiment detailed above, explanation has been made on the example in which a plurality of values are acquired based on the brightness of each pixel from a group of the gradation conversion characteristics g1(V) and g2(V) each represented by a curve that is monotonically increasing and concave upward while in the second embodiment detailed above, explanation has been made on the example in which a plurality of values are acquired based on brightness of each pixel from a group of the gradation conversion characteristic g2(V) represented by a curve that is monotonically increasing and concave upward and the gradation conversion characteristic g3(V) represented by a curve that is monotonically increasing and concave downward.

However, the present invention should not be construed as being limited to the above, and it would be also acceptable to set three gradation conversion characteristics, i.e., the gradation conversion characteristics g1(V) and g2(V), each of which is represented by a curve that is monotonically increasing and concave upward, and the gradation characteristic represented by a curve that is monotonically increasing and concave downward in advance, and if the average luminance of the whole input RGB image is less than a predetermined value, the processing is performed by using a group of gradation characteristics of monotonically increasing and being concave upward, that is, a group of g1(V) and g2(V). On the other hand, if the average luminance of the whole input RGB image is equal to or more than the predetermined value, a group of the gradation conversion characteristics that are monotonically increasing and concave upward or concave downward, for example, a group of g1(V) and g3(V) may be used to perform the processing. This makes it possible to perform correction such that if the input RGB image is wholly dark, the whole image is corrected to become brighter by using a group of gradation characteristics that are monotonically increasing and concave upward, which are suitable for correction of dark portion, while if the input RBG image is wholly bright, the whole image is corrected to become not too bright by using a group of the gradation characteristic that is monotonically increasing and concave upward, which is suitable for correction of a dark portion, and the gradation characteristic that is monotonically increasing and concave downward, which is suitable for correction of a bright portion. FIG. 18 is a diagram illustrating a flowchart of the above-mentioned processing performed by the image processing unit 103a. Note that average luminance is not always average luminance of the whole input RGB image but it may be a portion of the predetermined range. Further, if the average luminance is equal to or more than the predetermined value, it would be acceptable to perform the processing by using a group of g2(V) and g3(V).

Further, in a similar manner, it would be also acceptable to set three or more types of gradation conversion characteristics gN(V) (N>2) in advance and select two of them depending on the luminance of the whole luminance. For example, an image to be corrected may be divided into a plurality of regions, which are grouped into a wholly bright case or a wholly dark case for each divided region. Then, two groups out of the three or more types of the gradation conversion characteristics gN(V) (N>2) may be selected depending on the brightness of the whole region.

Figure 15:
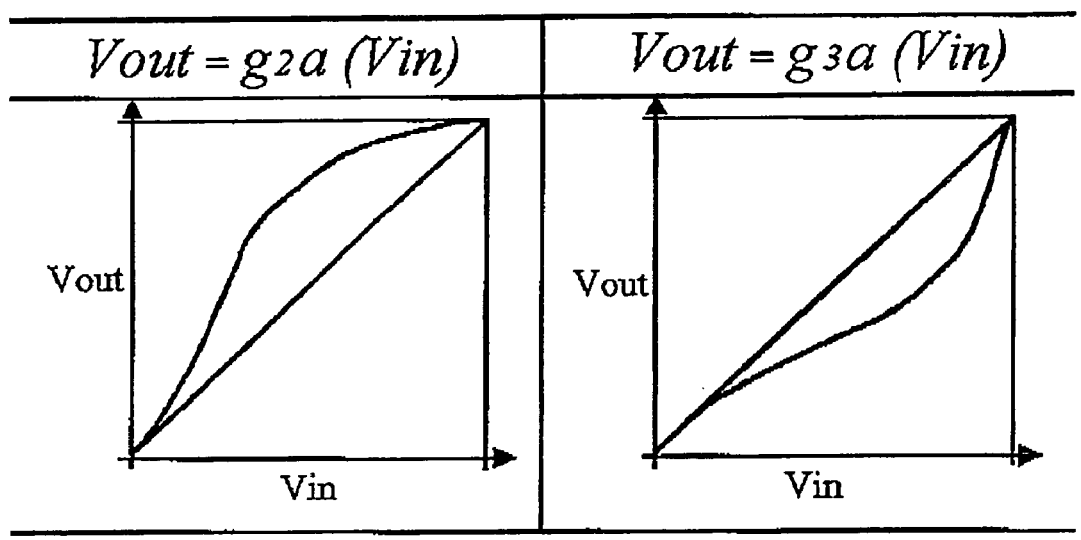
FIG. 15 is a diagram showing variation examples of inputting/outputting characteristics of gradation conversion characteristics g2(V) and g3(V)

(4) In the second embodiment and the variation example (3) detailed above, explanation has been made on the examples in which the gradation conversion characteristic g2(V) represented by a curve that is monotonically increasing and concave upward and the gradation conversion characteristic g3(V) represented by a curve that is monotonically increasing and concave downward are set as illustrated in FIG. 5. However, the present invention should not be construed as being limited thereto. For example, as illustrated in FIG. 15, the gradation characteristic may be set such that the curve is monotonically increasing and a part thereof is concave upward or the curve is monotonically increasing and a part thereof is concave downward.

Figure 16:
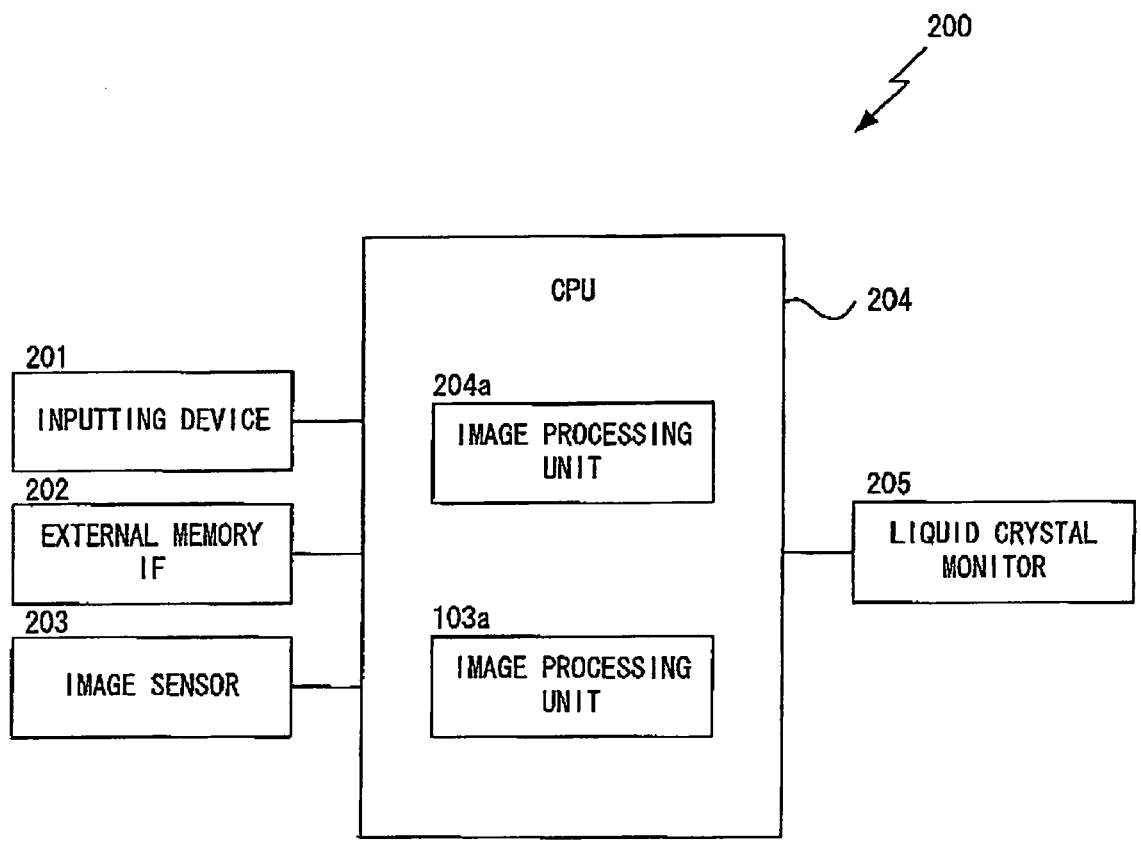
FIG. 16 is a block diagram showing a configuration example of an image processing device as mounted on a digital camera.

(5) The image processing unit 103a in the image processing device 100 according to any one of the first to fifth embodiments detailed above may be mounted on an image-capturing device 200, for example, a digital camera. The image-capturing device 200, as shown in FIG. 16, is a generic digital camera that includes an inputting device 201, for example, a release button, an external memory IF 202 for inserting an external memory, such as a memory card, an image sensor 203, for example, a CCD, a CPU 204, and a liquid crystal monitor 205. The CPU 204 includes a photographing processing unit 204a that controls the capturing of an image by the image sensor 203 and an image processing unit 103a. The image processing unit 103a performs various types of image processing that are known to the image captured by the image sensor 203 and also executes gradation correction processing according to the first to fifth embodiments detailed above to any image selected by the user. Note that the image processing unit 103a in the image processing device 100 according to the fifth embodiment detailed above is to be mounted on a digital camera, the digital camera is assumed to be provided with a function to set an exposure correction value.

(6) In the third embodiment detailed above, explanation has been made on the example in which a luminance evaluation value as brightness of neighborhood pixels of each pixel is calculated based on the input RGB image. However, the present invention should not be construed as being limited thereto and the luminance evaluation value may be calculated based on a reduced image a or a thumbnail image of the input RGB image.

(7) In the third embodiment detailed above, explanation has been made on the example in which when the target image to be corrected correspond to image data of an RGB format (image data expressed in primary color system expression), gradation correction of G of a pixel on which attention is focused included in the input RGB image is performed based on G of one color component G of the pixel on which attention is focused and G of neighborhood average; a gain coefficient is derived from G of the pixel on which attention is focused and G of the pixel on which attention is focused after the gradation correction; and gradation correction on other color components R and B is performed based on the derived gain coefficient. However, the present invention should not be construed as being limited thereto and the following example may also be acceptable. That is, when the target image to be corrected correspond to image data of a YCbCr format, a gain coefficient is calculated based on a luminance Y of a pixel on which attention is focused and a luminance Y of neighborhood pixels to perform gradation correction of the luminance Y of the pixel on which attention is focused. On this occasion, it is preferred to perform correction such that chrominances (color differences) Cb, Cr are corrected according to the gain coefficient used for correcting the luminance Y of the pixel on which attention is focused so as not to vary in saturation from the image data before the correction.

(8) In the third embodiment detailed above, explanation has been made on the example in which R and B are subjected to gradation correction by pixel according to the equations (19) and (20), respectively. However, the present invention should not be construed as being limited thereto and it would be also acceptable to divide the imaging plane of the input Bayer image into 6×4 regions and perform gradation correction of R and B for each of the divided regions.

(9) In the fifth embodiment detailed above, explanation has been made on the example in which the luminance evaluation value of each region when the imaging plane of the input RGB image is divided into 6×4 regions is corrected based on the exposure correction value included in the image data. However, the present invention should not be construed as being limited thereto and it would be also acceptable to correct the gradation conversion characteristics or gain characteristics used in the gradation correction according to the exposure correction value.

Figure 17:
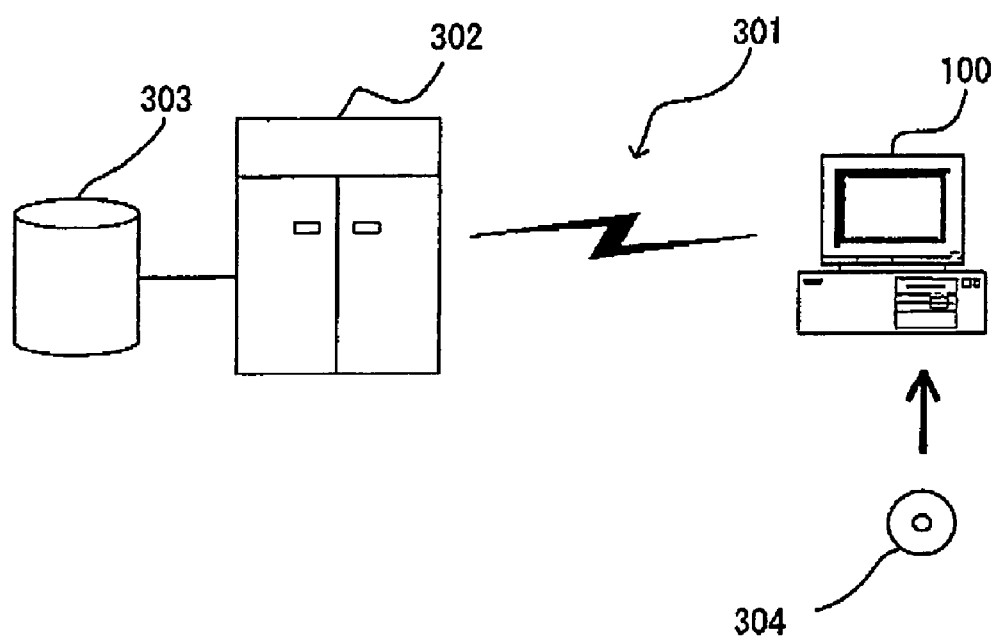
FIG. 17 is a diagram illustrating how to provide an image processing program to an image processing device.

(10) In the embodiments detailed above, explanation has been made assuming that the image processing program is stored in the memory 102. The image processing program may be provided to the image processing device (personal computer) 100 through a recording medium such as a CDROM or data signals such as the Internet. FIG. 17 is a diagram illustrating how to achieve this. The image processing device 100 is provided with the image processing program through a CD-ROM 304. In addition, the image processing device 100 has a connecting function to a communication line 301. A computer 302 is a server computer that provides the image processing program and stores the image processing program in a recording medium such as a hard disk 303. The communication line 301 is a communication line such as the Internet, a dedicated communication line, or the like. The computer 302 reads in data of the image processing program from the hard disk 303, and transmits the read-in image processing program data to the image processing device 100 through the communication line 301. That is, the image processing program is embodied as data signals on a carrier wave, which then is transmitted through the communication line 301. In this manner, the image processing program may be supplied as a computer-readable computer program product that can be of various forms such as a recording medium or a carrier wave.

(11) In the embodiments detailed above, explanation has been made on the example in which the image data serving as a target of image processing are stored in the memory 102. The image data, like the above-mentioned image processing program, can be acquired by the image processing device 100 through a recording medium such as a CD-ROM or data signals such as the Internet. The image processing device 100 may be connected to the digital camera through a USB interface cable or the like to acquire the image data.

Note that the present invention is not limited to the construction of the above-mentioned embodiment as far as the characteristic functions of the present invention are not damaged.

The disclosures of the following basic applications on which the present application claims priority is herein incorporated by reference:

Japanese Patent Application No. 2005-179067 filed Jun. 20, 2005; and

Japanese Patent Application No. 2005-284569 filed Sep. 29, 2005.

The invention claimed is:

1. An image processing device comprising:
a parameter calculation unit that obtains a plurality of values after gradation conversion respectively based on a plurality of different gradation conversion characteristics for a target pixel in image data;
a weighting unit that performs predetermined weighting on the plurality of values obtained by the parameter calculation unit; and
a gradation correction unit that performs gradation correction of the target pixel in the image data based on a result of the weighting by the weighting unit, wherein:
the weighting unit obtains an average brightness of neighboring pixels of the target pixel, performs the predetermining weighting on the plurality of values obtained by the parameter calculation unit according to the average brightness of the neighboring pixels, and generates a converted value by combining the plurality of values having performed the predetermined weighting; and
the gradation correction unit includes a gain coefficient calculation unit that calculates a gain coefficient of the target pixel based on a value of the target pixel and the converted value, and performs the gradation correction of the target pixel in the image data according to the gain coefficient calculated by the gain coefficient calculation unit.

2. An image processing device according to claim 1, further comprising:
an exposure correction value acquiring unit that acquires an exposure correction value set upon capturing an image corresponding to the image data; and
a brightness correcting unit that corrects brightness of the neighborhood pixels neighboring the target pixel based on a result of the acquiring by the exposure correction value acquiring unit, wherein:
the parameter calculation unit obtains the plurality of values based on image data corrected by the brightness correcting unit.

3. An image processing device according to claim 1, further comprising:
a selection unit that selects two gradation conversion characteristics out of the plurality of gradation conversion characteristics that are three or more types of gradation conversion characteristics according to brightness of the image, wherein:
the parameter calculation unit obtains the plurality of values with a brightness value of the target pixel using each of the two gradation conversion characteristics selected by the selection unit.

4. An image processing device according to claim 3, wherein:
the plurality of gradation conversion characteristics include a first gradation conversion characteristic having a characteristic represented by a curve that is monotonically increasing and concave upward in at least a part thereof, a second gradation conversion characteristic having a characteristic represented by a curve that is monotonically increasing and concave upward in at least a part thereof and having the characteristic in which a change of an output value for an input is smaller than the first gradation conversion characteristic, and a third gradation conversion characteristic having a characteristic represented by a curve that is monotonically increasing and concave downward in at least a part thereof.

5. An image processing device according to claim 4, wherein:
when an average luminance within a predetermined range of the image data is less than a predetermined value, the selection unit selects the first gradation conversion characteristic and the second gradation conversion characteristic.

6. An image processing device according to claim 4, wherein:
when an average luminance within a predetermined range of the image data is equal to or more than a predetermined value, the selection unit selects the first gradation conversion characteristic or the second gradation conversion characteristic, and the third gradation conversion characteristic.

7. An image processing device according to claim 1, wherein:
when the image data are expressed in a primary color system expression, the gain coefficient calculation unit calculates the gain coefficient based on one color component included in the image data;
the gradation correction unit performs the gradation correction of the one color component and also another color component of the target pixel in the image data according to the gain coefficient calculated by the gain coefficient calculation unit.

8. An image processing device according to claim 1, wherein:
when the image data are expressed in a luminance and chrominance expression, the gain coefficient calculation unit calculates the gain coefficient for performing gradation correction of a luminance of the target pixel in the image data based on a luminance of the image data.

9. An image processing device according to claim 8, further comprising:
a chrominance data correction unit that corrects chrominance data of the target pixel according to the gain coefficient for the target pixel obtained by the gain coefficient calculation unit.

10. An image processing device according to claim 1, wherein:
the plurality of values are a plurality of gain coefficients.

11. An image processing device according to claim 1, further comprising:
a reduced image generation unit that generates reduced image data of a reduced image based on the image data;
a smoothing unit that performs smoothing processing of the reduced image data; and
a neighborhood calculation unit that obtains the brightness of the neighborhood pixels based on the reduced image data having undergone the smoothing processing.

12. An image processing method comprising:
a parameter calculating step that obtains a plurality of values after gradation conversion respectively based on a plurality of different gradation conversion characteristics for a target pixel in image data;
a weighting step that performs predetermined weighting on the plurality of values obtained in the parameter calculating step; and
a gradation correction step that performs gradation correction of the target pixel in the image data based on a result of the weighting in the weighting step, wherein:
the weighting step obtains an average brightness of neighboring pixels of the target pixel, performs the predetermining weighting on the plurality of values obtained in the parameter calculating step according to the average brightness of the neighboring pixels, and generates a converted value by combining the plurality of values having performed the predetermined weighting; and
the gradation correction step includes a gain coefficient calculation step that calculates a gain coefficient of the target pixel based on a value of the target pixel and the converted value, and performs the gradation correction of the target pixel in the image data according to the gain coefficient calculated in the gain coefficient calculation step.

13. An image processing method according to claim 12, further comprising:
an exposure correction value acquiring step that acquires an exposure correction value set upon capturing an image corresponding to the image data; and
a brightness correction step that corrects brightness of the neighborhood pixels neighboring the target pixel based on a result of the exposure correction value acquiring step, wherein:
the parameter calculation step obtains the plurality of values based on image data corrected by the brightness correction step.

14. An image processing method according to claim 12, further comprising:
a selection step that selects two gradation conversion characteristics from three or more types of gradation conversion characteristics according to brightness of the image, wherein:
the parameter calculation step obtains the plurality of values with a brightness value of the target pixel using each of the two gradation conversion characteristics selected in the selection step.

15. An image processing method according to claim 14, wherein:
the plurality of gradation conversion characteristics include a first gradation conversion characteristic having a characteristic represented by a curve that is monotonically increasing and concave upward in at least a part thereof, a second gradation conversion characteristic having a characteristic represented by a curve that is monotonically increasing and concave upward in at least a part thereof and having the characteristic in which a change of an output value for an input is smaller than the first gradation conversion characteristic, and a third gradation conversion characteristic having a characteristic represented by a curve that is monotonically increasing and concave downward in at lest a part thereof.

16. An image processing method according to claim 15, wherein:
when an average luminance within a predetermined range of the image data is less than a predetermined value, the selection step selects the first gradation conversion characteristic and the second gradation conversion characteristic.

17. An image processing method according to claim 15, wherein:
when an average luminance within a predetermined range of the image data is equal to or more than a predetermined value, the selection step selects the first gradation conversion characteristic or the second gradation conversion characteristic, and the third gradation conversion characteristic.

18. An image processing method according to claim 12, wherein:
when the image data are expressed in a primary color system expression, the gain coefficient calculation step calculates the gain coefficient based on one color component included in the image data; and
the gradation correction step performs the gradation correction of the one color component and also another color component of the target pixel in the image data according to the gain coefficient calculated in the gain coefficient calculation step.

19. An image processing method according to claim 12, wherein:
when the image data are expressed in a luminance and chrominance expression, the gain coefficient calculation step calculates the gain coefficient for performing gradation correction of a luminance of the target pixel in the image data based on a luminance of the image data.

20. An image processing method according to claim 19, further comprising:
a chrominance data correction step that corrects chrominance data of the target pixel according to the gain coefficient for the target pixel obtained by the gain coefficient calculation step.

21. An image processing method according to claim 12, wherein:
the plurality of values are a plurality of gain coefficients.

22. An image processing method according to claim 12, further comprising:
a reduced image generation step that generates reduced image data of a reduced image based on the image data;
a smoothing step that performs smoothing processing of the reduced image data; and
a neighborhood calculation step that obtains the brightness of the neighborhood pixels based on the reduced image data having undergone the smoothing processing.

23. An image processing method comprising:
acquiring an image including a plurality of pixels;
obtaining a plurality of values corresponding to a plurality of different characteristics based on a value indicating a luminance of a target pixel;
obtaining brightness of a vicinity of the target pixel;
obtaining a weighted average of the obtained plurality of values based on the brightness of the vicinity of the target pixel;
calculating a gain coefficient of the target pixel based on the value indicating the luminance of the target pixel and the obtained weighted average; and
performing gradation correction of all color components of the target pixel by using the gain coefficient.

24. A non-transitory computer-readable medium comprising:
an image processing program for causing a computer to execute an image processing method according to claim 12.

25. An image-capturing device comprising:
an image sensor that captures an image; and
an image processing unit that executes an image processing program constituting a computer program product according to claim 24 to perform gradation correction of image data corresponding to the image captured by the image sensor.

26. An image processing method according to claim 1, wherein:
the weighting unit performs the predetermined weighting so that the darker the average brightness of the neighboring pixels is, the brighter the converted value is generated.

27. An image processing method according to claim 1, wherein:
the weighting unit performs the predetermined weighting so that the darker the average brightness of the neighboring pixels is, the smaller a value obtained based on one gradation conversion characteristic among the plurality of different gradation conversion characteristics is weighted and the greater a value obtained based on another gradation conversion characteristic, with which a value is converted brighter than the one gradation conversion characteristic, is weighted.

* * * * *